United States Patent

Nishino et al.

[11] Patent Number: 5,845,738
[45] Date of Patent: Dec. 8, 1998

[54] VEHICLE CONTROL APPARATUS

[75] Inventors: Kazuhisa Nishino; Hirohisa Awa, both of Kobe; Shunichi Wada, Tokyo, all of Japan

[73] Assignee: Mitsubishi Denki Kabushiki Kaisha, Tokyo, Japan

[21] Appl. No.: 615,462

[22] Filed: Mar. 14, 1996

[30] Foreign Application Priority Data

Aug. 31, 1995 [JP] Japan .................................. 7-223690

[51] Int. Cl.⁶ ....................................................... B62D 5/04
[52] U.S. Cl. ............................................. 180/443; 701/41
[58] Field of Search .................................. 180/443, 446; 701/41, 43

[56] References Cited

U.S. PATENT DOCUMENTS

| | | | |
|---|---|---|---|
| 5,482,129 | 1/1996 | Shimuzi | 180/446 |
| 5,504,679 | 4/1996 | Wada et al. | 180/446 |
| 5,507,359 | 4/1996 | Wada | 180/446 |
| 5,521,475 | 5/1996 | Fu et al. | 180/446 X |
| 5,530,648 | 6/1996 | Lavey | 180/446 X |
| 5,652,487 | 7/1997 | Nishino et al. | 180/446 X |

FOREIGN PATENT DOCUMENTS

| | | |
|---|---|---|
| 336 683 | 10/1989 | European Pat. Off. . |
| 654 393 | 11/1994 | European Pat. Off. . |
| 44 04 648 A1 | 8/1994 | Germany . |
| 1257674 | 10/1989 | Japan . |

*Primary Examiner*—Brian L. Johnson
*Assistant Examiner*—Avraham Lerner
*Attorney, Agent, or Firm*—Sughrue, Mion, Zinn, Macpeak & Seas, PLLC

[57] ABSTRACT

A vehicle control apparatus includes a steering torque sensor (1) for sensing a steering torque, a motor (3) for generating a steering assisting force, a CPU (22) for determining a motor drive direction based on at least the steering force and a motor drive direction restricting circuit (25) for restricting the drive direction of the motor (3) determined by the CPU (22) based on a steering force determination level as a motor drive direction determination criterion and the steering force, and the steering force determination level is changeable. With this arrangement, there is provided the vehicle control apparatus with safety and reliability by which the motor can be controlled with redundancy, the steering force determination level does not require such accuracy as to use pinpoint accuracy and further even if an abnormal state is caused in a motor output when a steering wheel is released from a hand and a steering torque exceeding the steering force determination level is generated, the steering force determination level is instantly changed to thereby restrict a motor drive direction so that the self-turn of the steering wheel is prevented.

8 Claims, 27 Drawing Sheets

VEHICLE CONTROL APPARATUS

BACKGROUND OF THE INVENTION

1. Field of the Invention

The present invention relates to a vehicle control apparatus having a motor drive direction restricting means for restricting a motor drive direction, and more specifically, to an electrically-driven power steering control apparatus for assisting and urging steering operation.

2. Description of the Related Art

Conventionally, a method of preventing the rotation of a motor in an unexpected direction caused by the abnormal state and the like of a CPU is proposed by Japanese Patent Publication No. 6-51475 filed by the inventors. This method is realized by an electrically-driven power steering apparatus for assisting and urging steering operation comprising a microcomputer for outputting a motor rightward drive signal and leftward drive signal based on the output from a steering torque sensor, a motor drive direction determination circuit for outputting a rightward drive signal and leftward control signal from the output of a steering torque sensor provided with a motor control circuit unit, and an AND circuit for outputting, when the output from the microcomputer coincides with the output from the motor drive discrimination circuit, a signal for driving a motor in the direction of the coincidence.

FIG. 29 is a circuit diagram showing a motor drive direction discrimination circuit (torque direction discrimination circuit) in the conventional electrically-driven power steering control apparatus disclosed in, for example, Japanese Patent Publication No. 6-51475.

In the drawing, a torque signal is input to the inverting input terminal of a comparator CMP1 and the non-inverting input terminal of a comparator CMP2. Further, a first fixed reference voltage E1 and a second fixed reference voltage E2 which are obtained by dividing a power supply voltage Vt by resistors R1, R2 and R3 are input to the non-inverting input terminal of the comparator CMP1 and the inverting input terminal of the comparator CMP2, respectively.

Next, the operation of the circuit will be described.

The comparator CMP 1 compares the torque signal t with the reference voltage E1 and when t>E1, the output Ex1 of the comparator CMP1 is at an L level. Whereas, when t<E1, the output Ex1 is at an H level.

Likewise, the comparator CMP2 compares the torque signal t with the reference voltage E2, and when t>E2, the output Ey1 of the comparator CMP2 is at the H level. Whereas, when t<E2, the output Ey1 is at the L level.

When the output Ex1 of the comparator CMP1 is at the H level, a rightward output is prohibited. Likewise, when the output Ey1 of the comparator CMP2 is at the H level, a leftward output is prohibited.

FIG. 30 is a view explaining a motor output and the operation of the torque direction discrimination circuit.

In the figure, a relationship T4<T1<T0<T2<T3 is established in torques from T0 to T4. The torque signal t<T0 results in a leftward torque, the torque signal t>T0 results in a rightward torque and the torque signal t=T0 results in neutral. When the torque signal t is between T2 and T3 or between T4 and T1, a value proportional to the torque signal t is determined as the motor output, when the torque signal t is equal to or less than T4 or larger than T3, the motor output is fixed to the maximum value Imax of a motor output current and when the torque signal t is between T1 and T2, the motor output becomes zero. Further, the relationship between torque determination reference values E1T and E2T corresponding to the reference voltages E1 and E2 of the torque direction discrimination circuit, respectively and the torque signals T1 and T2 are set to T1<E2T<E1T<T2. With this arrangement, when a torque is equal to or less than the reference value E1T, motor rightward drive is prohibited and when a torque is larger than the reference value E2T, motor leftward drive is prohibited. Further, when a torque is between the reference value E1T and E2T, both of rightward and leftward motor drive are prohibited.

The substitution of the non-inverting input terminals for the inverting input terminals of the comparators CMP1 and CMP2 of the torque direction discrimination circuit results in a torque direction discrimination circuit or a motor drive direction discrimination circuit as shown in FIG. 31.

In the drawing, the torque signal t is input to the non-inverting input terminal of a comparator CMP3 and the inverting input terminal of a comparator CMP4. Further, a third fixed reference voltage E3 and a fourth fixed reference voltage E4 which are obtained by diving the power supply voltage Vt by the resistors R1, R2 and R3 are input to the inverting input terminal of the comparator CMP3 and the non-inverting input terminal of the comparator CMP4, respectively.

Next, the operation of the circuit will be described.

The comparator CMP3 compares the torque signal t with the reference voltage E3 and when t>E3, the output Ex2 of the comparator CMP3 is at an H level. Whereas, when t<E3, the output Ex2 is at an L level. Likewise, the comparator CMP4 compares the torque signal t with the reference voltage E4 and when t>E4, the output Ey2 of the comparator CMP4 is at the L level. Whereas, when t<E4, the output Ey2 is at the H level.

When the output Ex2 of the comparator CMP3 is at the L level, a leftward output is permitted. Likewise, when the output Ey2 of the comparator CMP4 is at the L level, a rightward output is permitted.

FIG. 32 is a view explaining a motor output and the operation of the torque direction discrimination circuit.

In the drawing, a relationship T4<T1<T0<T2<T3 is established in torques from T0 to T4. The torque signal t<T0 results in a leftward torque, the torque signal t>T0 results in a rightward torque and the torque signal t=T0 results in neutral. When the torque signal t is between T2 and T3 or between T4 and T1, a value proportional to the torque signal t is determined as the motor output, when the torque signal t is equal to or less than T4 or larger than T3, the motor output is fixed to the maximum value Imax of a motor output current and when the torque signal t is between T1 and T2, the motor output becomes zero. Further, the relationship between torque determination reference values E3T and E4T corresponding to the reference voltages E3 and E4 of the torque direction discrimination circuit, respectively and the torque signals T1 and T2 is set to E4T<T1<T2<E3T. With this arrangement, when a torque is equal to or less than E3T, motor leftward drive is permitted and when a torque is larger than E4T, motor rightward drive is permitted. Further, when a torque is between the reference value E3T and E4T, both of rightward and leftward motor drive are permitted.

Since the conventional apparatus is arranged as described above, it has the following problem.

That is, the torque determination reference values E1T to E4T are fixed in the conventional apparatus. As a result, when the motor drive direction determination level (torque determination reference value) of a steering torque as the torque signal t is represented by E1T, E2T (E2T<E1T), motor drive direction restricting means including the torque direction discrimination circuit prohibits motor rightward drive when the steering torque t satisfies t<E2T and prohibits motor leftward drive when the steering torque satisfies E1T<t. Further, when the steering torque t satisfies E2T<t<E1T, there are two methods of permitting motor drive (hereinafter, referred to as neutral permission) and prohibiting motor drive (hereinafter, referred to as neutral prohibition). The neutral permission has characteristics shown in FIG. 32 and the neutral prohibition has characteristics shown in FIG. 30.

In the neutral prohibition, even if a steering wheel is released from a hand in an abnormal motor output (steering torque is neutral), since motor drive is prohibited, inconvenience such as the self-turn (unintentional rotation) of the steering wheel and the like is not caused and safety is secured. However, when a steering torque is within the neutral determination region (for example, when the steering wheel is released), since the motor drive direction restricting means prohibits motor drive, the motor cannot be controlled. That is, since there is a problem that a motor control cannot be executed in the neutral prohibition, the motor cannot be controlled with redundancy.

Further, the motor drive direction determination levels E1T, E2T must be set to T1<E2T<E1T<T2 From FIG. 30. This is because that when the motor drive direction determination levels E1T, E2T are set to E2T<T1<T<E1T, since a motor output is prohibited by the motor drive direction restricting means between E2T and T1 and between T2 and E1T, there is a problem that a motor current causes hunting. To cope with this problem, when the motor drive direction determination level is composed of an H/W, resistors and the like require pinpoint accuracy, and thus the cost of the H/W composed of the resistors and the like of pinpoint accuracy is increased.

Furthermore, since motor drive is prohibited when a steering torque is within the neutral determination region, there is a lack of an assisting force when the motor is driven so that when the steering wheel states to be cut, it is felt heavy. That is, the motor drive prohibition adversely affects the feeling in steering operation when a torque is neutral.

In addition, in the neutral permission, even if a steering torque is within the neutral determination region (between T1 and T2), a motor can be driven and thus the motor control can be executed with redundancy. However, since the motor can be driven even if a steering torque is within the neutral determination region, when the steering wheel is released from a hand in an abnormal motor output, there is possibility that the steering wheel turns by itself. To avoid the occurrence of a steering wheel self-turn mode and the like, the neutral permission region is conventionally set to a narrow region, wherein a problem is that the neutral permission region cannot be set in a wide range.

An object of the present invention made to overcome the above problems is to provide a vehicle control apparatus having both of the redundancy of a motor control as an advantage of neutral permission and the safety as an advantage of neutral prohibition by changing a steering force determination level and further capable of increasing the range of a neutral permission region and driving a motor even in a neutral prohibition region.

SUMMARY OF THE INVENTION

According to one aspect of the present invention, there is provided a vehicle control apparatus which comprises steering force sensing means for sensing a steering force, a motor for generating a steering assisting force, motor drive means for determining the drive direction of the motor based on at least the steering force, and motor drive direction restricting means for restricting the drive direction of the motor determined by the motor drive means based on a steering force determination level as the drive direction determination criterion of the motor and the steering force, wherein the steering force determination level is changeable.

According to this arrangement, there are advantages that a neutral permission region can be set in a wide range in a normal motor output, the motor can be controlled with redundancy due to the neutral permission region capable of being set to the wide range, and further since the steering force determination level is changed when the motor drive means is in an abnormal state, the steering force determination level does not require pinpoint accuracy. Further, when a steering torque exceeds the steering force determination level in an abnormal motor output, the steering force determination level is instantly changed to restrict a motor drive direction to the motor drive direction determined by a steering torque. As a result, even if an abnormal motor output is generated and thus a steering torque exceeding the steering force determination level is generated when a steering wheel is released from a hand, the self-turn of the steering wheel can be prevented by restricting the motor drive direction by the instant change of the steering force determination level, whereby there is an advantage that a system with safety and reliability can be provided.

In one form of the invention, the steering force determination level changes with a predetermined delay element with respect to the change of state of the motor drive means, and it is kept at a predetermined level in accordance with the state of the motor drive means.

According to this arrangement, a motor drive prohibition region can be set in correspondence to the state of the motor drive means. That is, since a direction in which the motor can be driven is set with respect to the state of the motor drive means and the motor is permitted to be driven only when a motor drive direction and a steering torque coincide with each other and when they do not coincide with each other, the motor is prohibited to be driven, there is an advantage that a system with safety and reliability can be provided. Further, since the delay element is provided with the change of the steering force determination level, such a control as to drive the motor in a direction opposite to a steering torque can be carried out by adjusting the time constant of the delay element while the steering force determination level changes. That is, there is an advantage that a motor is controlled with redundancy. Further, since the steering force determination level is changed depending upon the state of the motor drive means, the restriction against a motor drive direction is kept while the motor drive means carries out a motor output and thus when the restriction against the motor drive direction being kept is released, the motor output is stopped. Thus, there is an advantage that when the restriction effected by the motor drive direction restricting means is released, the motor is not driven and safety is secured.

In another form of the invention, the steering force determination level changes with a predetermined delay element with respect to the change of state of the motor drive means or the change of state of the motor drive direction restricting means, and the steering force determination level at the time when motor drive is output by the motor drive means or when a motor drive direction is restricted by the motor drive direction restricting means is kept until the state of the motor drive means and the state of the motor drive direction restricting means are made to a motor drive stop state and a motor drive direction restriction release state respectively.

According to this arrangement, when the motor is driven in an abnormal direction, since a motor drive prohibition region can be instantly set depending upon the state of the motor drive direction restricting means and further a restricted motor drive direction is not released until safety is confirmed by the state of the motor drive means and the state of the motor drive direction restricting means, there is an advantage that a system with safety and reliability can be provided. When the motor is driven in an abnormal direction, a motor drive direction is restricted by the motor drive direction restricting means and the steering force determination level is changed by the output from the motor drive direction restricting means, there is an advantage that when the motor is driven in an abnormal direction, a motor drive direction can be instantly restricted. Further, since the steering force determination level is also changed by the state of the motor drive means, there is an advantage that a motor drive prohibition region is set in accordance with a motor drive direction while a motor drive is output, that is, the motor drive prohibition region is kept until the motor drive output by the motor drive means is stopped.

In a further form of the invention, the steering force determination level changes with a predetermined delay element with respect to the change of state of the motor drive means, and the changing speed of the steering force determination level at the time when the motor drive means changes from a stop state to a drive state is made slower than the changing speed thereof when the motor drive means changes from the drive state to the stop state.

According to this arrangement, there is an advantage that the motor can be driven in a direction where the polarity of motor drive does not coincide with the polarity of a motor drive direction. Further, there is an advantage that the steering force determination level can be prevented from being made unstable by setting a different value to the time constant of the delay element when the motor is driven and when it is stopped. Further, the time constant which is changed by the stop of the motor is set faster than the time constant which is changed by the drive of the motor so that the steering force determination level instantly returns to the level at the time the motor drive is stopped. Thus, there is an advantage that when the motor is repeatedly driven and stopped, the steering force determination level instantly returns to the level at the time the motor drive is stopped, the steering force determination level is made stable and further the motor drive direction restricting means is difficult to cause malfunction. In a still further form of the invention, the steering force determination level changes with a predetermined delay element with respect to the change of state of the motor drive means or the change of state of the motor drive direction restricting means and the changing speed of the steering force determination level due to the change of state of the motor drive direction restricting means is made faster than the changing speed of the steering force determination level due to the change of state of the motor drive means.

According to this arrangement, there is an advantage that when a motor drive direction is restricted by the motor drive direction restricting means, the time constant of the delay element is changed and a direction in which the motor can be driven is restricted by instantly changing the steering force determination level, whereby the safety and reliability of the system is improved.

In a yet further form of the invention, the steering force determination level changes exceeding a neutral level when the motor drive means changes to a motor drive state or when the motor drive direction restricting means changes to a motor drive direction restricting state.

According to this arrangement, a direction in which the motor can be driven is restricted to one direction, that is, one direction including a neutral position is set as a motor drive restricting region by the steering force determination level. As a result, the motor can be driven when the polarity of a motor drive direction and the polarity of a steering torque coincide with each other as well as the absolute value of the steering torque changes exceeding the neutral position and becomes larger than the steering force determination level, thus even if the steering wheel is released from a hand (a steering torque becomes neutral) when a motor output is in an abnormal state, inconvenience such as the self-turn of the steering wheel and the like (the motor drive direction is restricted because when the steering wheel is released, the polarity of the steering torque caused by the motor drive does not coincide with the polarity of the motor drive direction), whereby a system with safety and reliability can be provided.

In a still another form of the invention, the steering force determination level changes with respect to at least the state of the motor drive means or the state of the motor drive direction restricting means, and when said motor is not driven, the steering force determination level is set to the level which is taken when restriction by the motor drive direction restricting means is released.

According to this arrangement, when the motor is not driven, the restriction against a motor drive direction is released and this is also applicable to a direction in which the motor is not driven in the same way, and, for example, when the motor is driven rightward, the steering force determination level is set to a level by which the restriction against a motor rightward drive direction is released and a sufficient assisting force can be obtained when the steering wheel starts to be cut in combination with the delay of change of the steering force determination level when the motor is driven. Thus, there is an advantage that the motor can be smoothly driven an adverse affect to steering feeling can be prevented.

In a still another form of the invention, the steering force determination level changes with a delay element with respect to at least the state of the motor drive means or the state of the motor drive direction restricting means, and the steering force determination level at the time when the restriction against a motor drive direction made by the motor drive direction restricting means is released is made larger than a predetermined value.

According to this arrangement, a motor drive direction can be prevented from being restricted by the motor drive direction restricting means which is operated by a steering torque caused by the control and the like for driving the motor in a direction where the polarity of a motor drive direction does not coincide with the polarity of a steering torque. Thus, there is an advantage that the motor can be controlled with redundancy.

In a still another form of the invention, there is provided a vehicle speed sensing means for sensing a vehicle speed, wherein the steering force determination level changes with respect to at least the state of the motor drive means, or the state of the motor drive direction restricting means and the steering force determination level at the time when the restriction against a motor drive direction made by the motor drive direction restricting means is released is set with respect to the vehicle speed.

According to this arrangement, there is an advantage that malfunction of the motor drive direction restricting means caused when the steering wheel is operated at a high speed can be suppressed by that when a maximum torque generated at the time the steering wheel is operated at the high speed is larger than a predetermined vehicle speed within a steering torque input range, the steering force determination level is set larger than the maximum torque.

In a still another form of the invention, there is provided a clutch for coupling the motor with a steering system, wherein the steering force determination level changes with respect to at least the state of the motor drive means or the state of the motor drive direction restricting means, and when the clutch is disengaged, the restriction made by the motor drive direction restricting means is released.

According to this arrangement, there is an advantage that an abnormal state such as motor lock and the like can be checked by driving the motor, and since the motor is driven when a clutch is disengaged, a motor assisting force is not transmitted to the steering wheel and safety is secured.

In a still another form of the invention, the steering force determination level changes with respect to at least the state of the motor drive means or the state of the motor drive direction restricting means, and it is set within the input possible range of the steering force sensing means.

According to this arrangement, there is an advantage that when an abnormal steering force is generated by an abnormal motor output, the motor drive direction restricting means is operated to restrict a motor drive direction, whereby the occurrence of the self-turn of the steering wheel and the like can be prevented and thus safety and reliability is improved.

In a still another form of the invention, the steering force determination level changes with respect to at least the state of the motor drive means or the state of the motor drive direction restricting means, and motor drive is prohibited when the restriction against a motor drive direction made by the motor drive direction restricting means continues longer than a predetermined period of time at the time the steering force has a value equal to or less than a predetermined value.

According to this arrangement, there is an advantage that when a motor drive direction is restricted by the motor drive direction restricting means, the failure of the motor drive direction restricting means, motor drive means and the like can be sensed and thus the safety and reliability of the system is improved.

In a still another form of the invention, the steering force determination level changes with respect to at least the state of the motor drive means or the state of the motor drive direction restricting means, and the operation of the motor drive direction restricting means is estimated from the state of the motor drive means or the steering force and it is compared with the operation of the motor drive direction restricting means, and when the incoincidence of them continues longer than a predetermined period of time, motor drive is prohibited.

According to this arrangement, there is an advantage that since the abnormal state of the motor drive direction restricting means, motor drive means, steering force sensing means and the like can be sensed regardless of the state of the motor drive torque restricting means and thus the reliability of the system is improved.

According to another aspect of the present invention, there is provided a vehicle control apparatus which comprises steering force sensing means for sensing a steering force, a motor for generating a steering assisting force, a target current determination means connected to the steering force sensing means for determining a target motor current based on at least the steering force, current sensing means for sensing a current flowing to the motor, motor drive means connected to the steering force sensing means for determining a motor drive direction based on at least the steering force, and motor drive direction restricting means connected to the steering force sensing means and the motor drive means and changing with respect to at least the state of the motor drive means for restricting the motor drive direction based on a steering force determination level as a drive direction determination criterion of the motor and the steering force, wherein a feedback control is carried out so that a current flowing to the motor becomes the target current determined by the target current determination means and when a motor drive direction is restricted by the motor drive direction restricting means, a motor output is stopped and the target motor current is set to zero.

According to this arrangement, there is an advantage that the occurrence of an abnormal state in a motor control system can be prevented and further there can be solved the inconvenience of occurrence of an abnormal state such as shock and the like to the steering feeling of the steering wheel due to the suspension of the flow of a large current when the restriction against a motor drive direction made by the motor drive direction restricting means is released.

According to a further aspect of the present invention, there is provided a vehicle control apparatus which comprises steering force sensing means for sensing a steering force, a motor for generating a steering assisting force, a first microcomputer connected to the steering force sensing means for controlling the motor by determining a motor drive direction based on the steering force, and a second microcomputer connected to the steering force sensing means and the first microcomputer for restricting the drive of the motor by determining a motor drive restricting direction based on the motor drive direction of the first microcomputer and at least the steering force, wherein the second microcomputer includes a motor drive restricting means for changing a steering force determination level in accordance with the motor drive direction of the first microcomputer as well as determining the motor drive restricting direction in accordance with the result of comparison of the steering force with the steering force determination level, and the motor drive restricting means restricts the motor drive restricting direction in accordance with the result of comparison of the steering force determination level which constitutes a pair with a motor drive direction determined based on the steering torque and the steering force.

According to this arrangement, there is an advantage that since a motor drive direction can be restricted by comparing only the steering force determination level corresponding to a motor drive direction with a steering force and motor drive can be restricted only in a direction corresponding to the polarity of the steering force, thus excellent steering feeling can be provided by removing an adverse affect applied to steering feeing by the motor drive direction restricting means and the safety and reliability of the system is improved.

In a still another form of the invention, phase compensation means is interposed between the steering force sensing means and the motor drive direction restricting means.

According to this invention, there is an advantage that since the phase compensation means is interposed between the steering force sensing means and the motor drive direction restricting means, the hunting of a motor current can be suppressed which is caused a difference between the response speed of the control system and the response speed of the motor drive direction restricting means.

In a still another form of the invention, the motor drive means includes a bridge circuit composed of at least four transistors and the motor drive direction restricting means restricts operation with respect to a pair of the transistors of the bridge circuit.

According to this arrangement, there is an advantage that the occurrence of a motor regenerative current is prevented to thereby reduce a difference between a right steering torque and a left steering torque.

DESCRIPTION OF PREFERRED EMBODIMENTS

Embodiments of the present invention will be described below with reference to the drawings with respect to an example in which the present invention is applied to an electrically-driven power steering control apparatus as an example.

Embodiment 1

Figure 1:
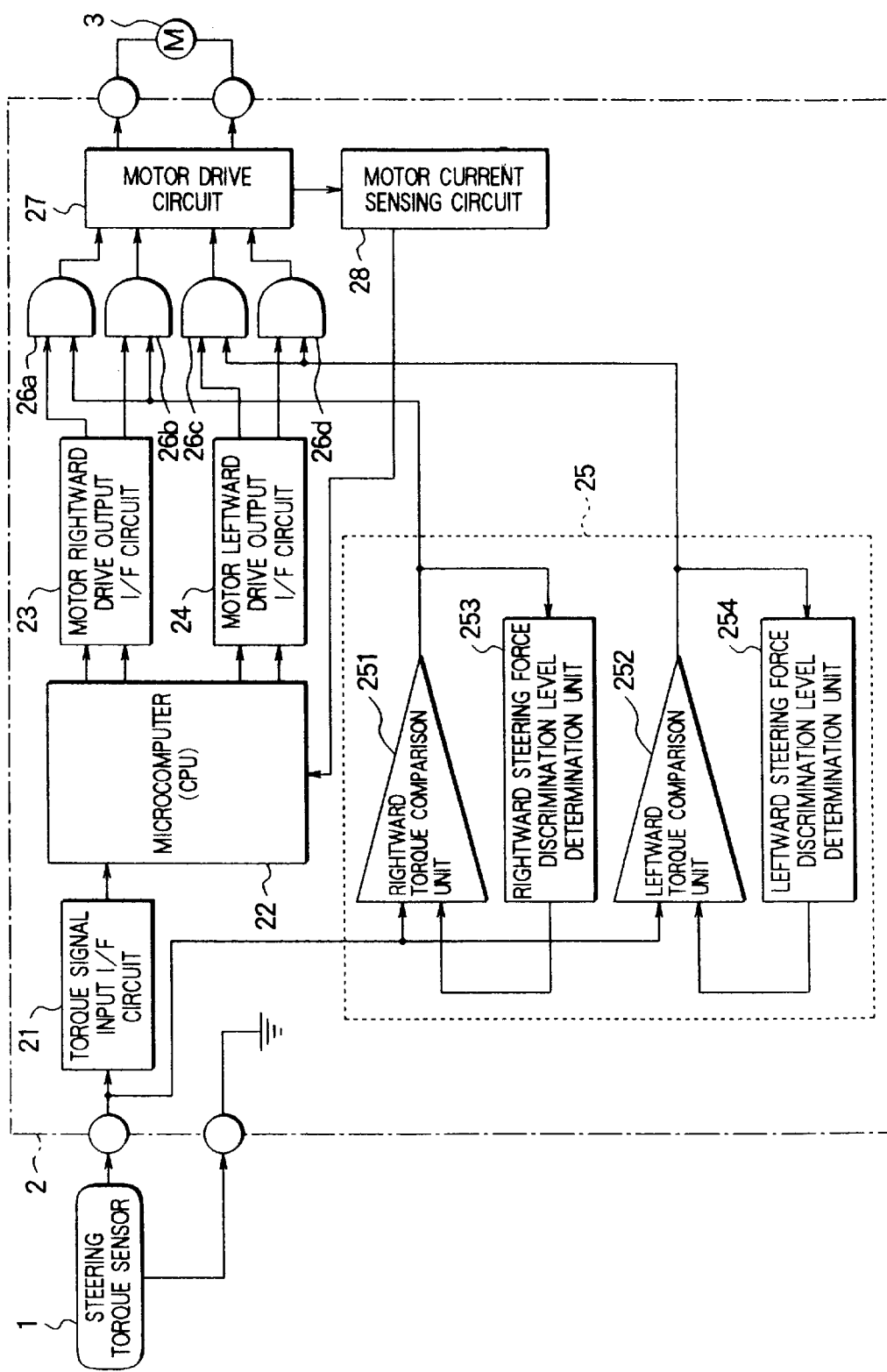
FIG. 1 is a block diagram showing the arrangement of an embodiment 1 of a vehicle control apparatus according to the present invention.

FIG. 1 is a block diagram showing the arrangement of an embodiment 1 of the present invention.

In the drawing, a vehicle control apparatus includes a steering torque sensor 1 as steering force sensing means for sensing a twisting force applied to a steering system, a controller 2 for an electrically-driven power steering system and a motor 3 connected to the steering system.

Usually, the electrically-driven power steering system senses a steering force by the steering torque sensor 1 and the controller 2 determines a motor current corresponding to the steering force and drives the motor 3. The motor 3 generates an assisting force corresponding to the current flowing to the motor 3 to assist steering operation.

The controller 2 is composed of a torque signal input I/F circuit 21 to which an output signal is supplied from the steering torque sensor 1, a microcomputer 22 (hereinafter, referred to as CPU 22) which is supplied with a torque signal as an output signal from the torque signal input I/F circuit 21 and outputs a signal for driving the motor 3 according to the torque signal, a motor rightward drive output I/F circuit 23 and motor leftward drive output I/F circuit 24 for outputting a motor rightward drive signal and motor leftward drive signal, respectively based on the motor drive signal from the CPU 22, a motor drive direction restricting circuit 25 as motor drive direction control means for restricting a motor drive direction based on the output signal from the steering torque sensor 1, AND circuits 26a, 26b for determining whether or not the output from the motor rightward drive output I/F circuit 23 coincides with the output from the motor drive direction restricting circuit 25 and outputting a motor drive prohibition signal when they do not coincide with each other, AND circuits 26c, 26d for determining whether or not the output from the motor leftward drive output I/F circuit 24 coincides with the output from the motor drive direction restricting circuit 25 and outputting a motor drive prohibition signal when they do not coincide with each other in the same manner, a motor drive circuit 27 for driving the motor 3 in response to the output signals from the AND circuits 26a, 26b, 26c and 26d and a motor current sensing circuit 28 connected to the motor drive circuit 27 for sensing the current flowing to the motor 3.

The motor drive direction restricting circuit 25 in the controller 2 inputs the signal from the steering torque sensor 1 to a rightward torque comparison unit 251 and a leftward torque comparison unit 252. The rightward torque comparison unit 251 compares the rightward steering force determination level determined by a rightward steering force discrimination level determination unit 253 with the signal from the steering torque sensor 1 and restricts motor rightward drive by the result of comparison. Further, the leftward torque comparison unit 252 compares the leftward steering force determination level determined by a leftward steering force discrimination level determination unit 254 with the signal from the steering torque sensor 1 and restricts motor leftward drive by the result of comparison.

The rightward steering force determination level to be determined by the rightward steering force discrimination level determination unit 253 is determined based on the result of the output from the rightward torque comparison unit 251. Further, the leftward steering force determination level to be determined by the leftward steering force discrimination level determination unit 254 is determined based on the result of the output from the leftward torque comparison unit 252.

Figure 2:
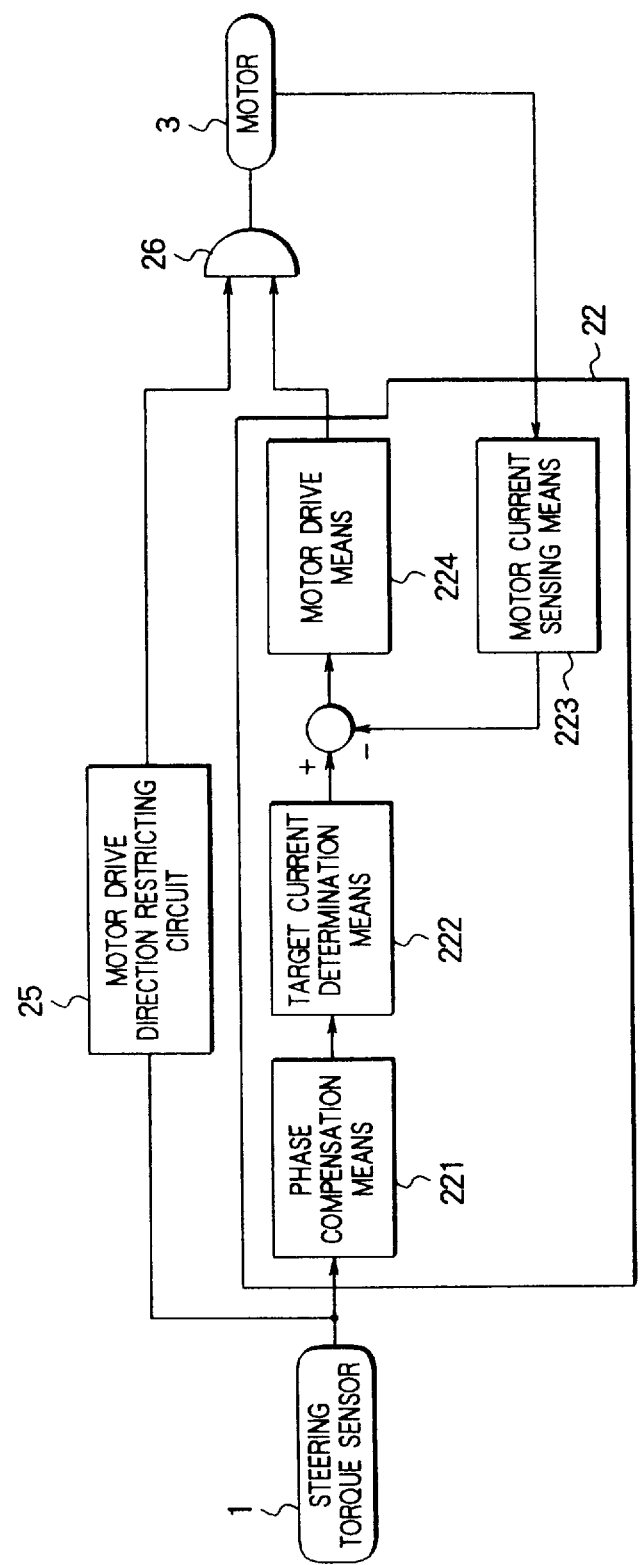
FIG. 2 is a block diagram showing the function of the embodiment 1 of the vehicle control apparatus according to the present invention.

FIG. 2 shows an example of the functional block diagram of the CPU 22. The CPU 22 is composed of phase compensation means 221 to which the output from the steering torque sensor 1 is supplied through the torque signal input I/F circuit 21 (FIG. 1), target current determination means 222 to which the output from the phase compensation means 221 is supplied, motor current sensing means 223 to which the output from the motor current sensing circuit 28 (FIG. 1) is supplied and motor drive means 224 to which the added output of the output from the target current determination means 222 and the output from the motor current sensing means 223 is supplied.

The phase of the steering torque sensed by the steering torque sensor 1 is compensated by the phase compensation means 221 in the CPU 22 and the target current determination means 222 determines a target current using the phase-compensated torque value. The motor current sensing means 223 senses the current flowing to the motor 3. Then, a deviation between the target current value determined by the target current determination means 222 and the motor current sensed by the motor current sensing means 223 is determined and the motor drive means 224 outputs a motor drive signal based on the deviation. The motor drive signal is used as the motor drive signal of the CPU 22. The motor 3 is driven in response to a signal obtained by ANDing the motor drive signal from the CPU 22 and the motor drive signal from the motor drive direction restricting circuit 25 by the AND circuit 26.

Next, overall operation will be described.

When the output from the steering torque sensor 1 is supplied to the CPU 22 through the torque signal input I/F circuit 21, the CPU 22 determines a motor drive direction and a target motor current value based on the torque signal from the torque signal input I/F circuit 21. When a rightward torque is generated, the motor drive direction is a right direction and when a leftward torque is generated, the motor drive direction is a left direction.

Further, the CPU 22 determines a motor output value from a difference between the motor current value sensed by the motor current sensing circuit 28 and the target motor current value and outputs the motor output value to the motor rightward drive output I/F circuit 23 or motor leftward drive output I/F circuit 24.

When a motor rightward drive signal and the motor output value are input to the motor rightward drive output I/F circuit 23 from the CPU 22, the motor rightward drive output I/F circuit 23 outputs a motor rightward drive output signal to the AND circuits 26a and 26b.

Likewise, when a motor leftward drive signal and the motor output value are input to the motor leftward drive output I/F circuit 24 from the CPU 22, the motor leftward drive output I/F circuit 24 outputs a motor leftward drive output signal to the AND circuits 26c and 26d.

The motor drive direction restricting circuit 25 restricts a motor drive direction based on the output from the steering torque sensor 1 regardless of the processing executed by the CPU 22.

Figure 3:
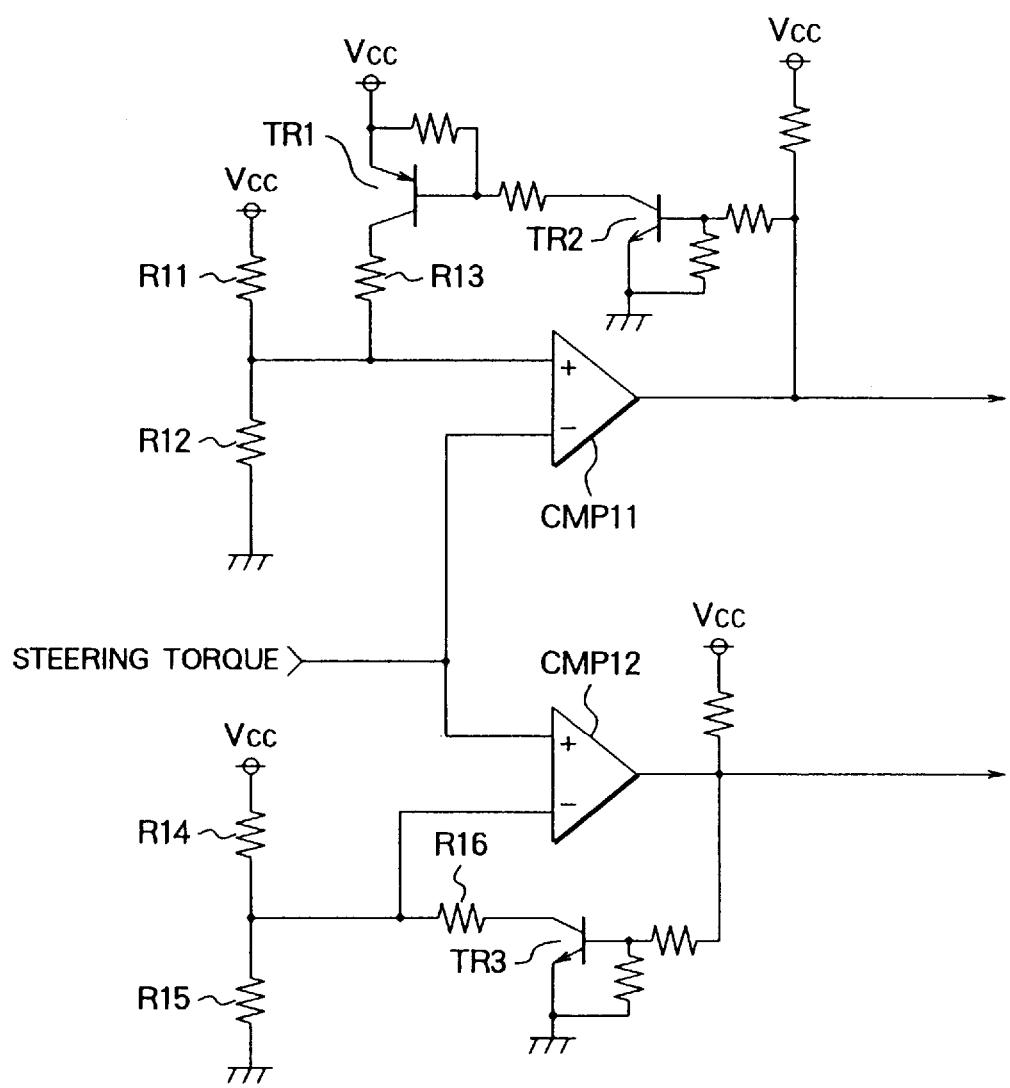
FIG. 3 is a circuit diagram showing a main portion of the embodiment 1 of the vehicle control apparatus according to the present invention.

FIG. 3 is a circuit diagram showing an example of the specific circuit arrangement of the motor drive direction restricting circuit 25.

In the drawing, CMP11 denotes a comparator constituting the rightward torque comparison unit 251 and having a non-inverting input terminal connected to the node where voltage dividing resistors R11 and R12, which are connected between a power supply terminal Vcc and the ground, are connected and an inverting input terminal to which a steering torque is supplied from the steering torque sensor 1. A plurality of transistors TR1 and TR2 are connected between the non-inverting input terminal and output terminal of the comparator CMP11. The transistor TR1 has an emitter connected to the power supply terminal Vcc, a collector connected to the non-inverting input terminal of the comparator CMP11 through the resistor R13 and a base connected to the collector of the transistor TR2 through a resistor. The transistor TR2 has an emitter grounded and a base connected to the output terminal of the comparator CMP11 through a resistor. The components other than the comparator CMP11 constitutes the rightward steering force discrimination level determination unit 253.

Likewise, CMP12 denotes a comparator constituting the leftward torque comparison unit 252 and having an inverting input terminal connected to the node where voltage dividing resistors R14 and R15, which are connected between the power supply terminal Vcc and the ground, are connected and a non-inverting input terminal to which the steering torque is supplied from the steering torque sensor 1. A transistor TR3 is connected between the inverting input terminal and output terminal of the comparator CMP12. The transistor TR3 has an emitter grounded, a collector connected to the inverting input terminal of the comparator CMP12 through a resistor R16 and a base connected to the output terminal of the comparator CMP12 through a resistor. The components other than the comparator CMP12 constitutes the leftward steering force discrimination level determination unit 254.

The comparator CMP11 compares the level of the non-inverting input terminal with the level of the inverting input terminal. That is, the comparator CMP11 compares the output from the rightward steering force discrimination level determination unit 253 with the level of the output from the steering torque sensor 1, and when the level of the non-inverting input terminal is larger than the level of the inverting input terminal, the comparator CMP11 outputs a high level "H", whereas when the level of the non-inverting input terminal is smaller than the level of the inverting input terminal, it outputs a low level "L".

When the output from the comparator CMP11 is at the high level "H", the motor rightward drive is prohibited. At the time, since the transistors TR2 and TR1 are turned on together, the level of the non-inverting input terminal of the comparator CMP11, that is, the steering force determination value V4 (refer to FIG. 5) supplied from the rightward steering force discrimination level determination unit 253 to the comparator CMP11 is determined by the resistors R11, R12 and R13.

When it is assumed that the resistance values of the resistors and the power supply voltage of the power supply terminal are represented by the same numerals as these components, the steering force determination value V4 is represented by the following formula.

$$V4 = R12/[\{R11 \cdot R13/(R11+R13)\} + R12] \times Vcc \quad (1)$$

When the output from the comparator CMP11 is at the low level "L", the motor rightward drive is permitted. At the time, since the transistors TR2 and TR1 are turned off together, the level of the non-inverting input terminal of the comparator CMP11, that is, the steering force determination value V2 (refer to FIG. 5) supplied from the rightward steering force discrimination level determination unit 253 to the comparator CMP11 is determined by the resistors R11 and R12. That is, the steering force determination value V2 is represented by the following formula.

$$V2 = R12/(R11+R12) \times Vcc \quad (2)$$

The comparator CMP12 compares the level of the inverting input terminal with the level of the non-inverting input terminal. That is, the comparator CMP12 compares the output from the leftward steering force discrimination level determination unit 254 with the level of the output from the steering torque sensor 1, and when the level of the inverting input terminal is larger than the level of the non-inverting input terminal, the comparator CMP12 outputs the low level "L", whereas when the level of the inverting input terminal is smaller than the level of the non-inverting input terminal, it outputs the high level "H".

When the output from the comparator CMP12 is at the high level "H", motor leftward drive is prohibited. At the time, since the transistor TR3 is turned on, the level of the non-inverting input of the comparator CMP12, that is, the steering force determination value V3 (refer to FIG. 5) supplied from the leftward steering force discrimination level determination unit 254 to the comparator CMP12 is determined by the resistors R14, R15 and R16.

When it is assumed that the resistance values of the resistors and the power supply voltage of the power supply terminal are represented by the same numerals as these components, the steering force determination value V3 is represented by the following formula.

$$V3 = \{R15 \cdot R16/(R15+R16)\}/[\{R15 \cdot R16/(R15+R16)\} + R14] \times Vcc \quad (3)$$

When the output from the comparator CMP11 is at the low level "L", the motor leftward drive is permitted. At the time, since the transistor TR3 is turned off, the level of the inverting input terminal of the comparator CMP12, that is, the steering force determination value V1 (refer to FIG. 5) supplied from the leftward steering force discrimination level determination unit 254 to the comparator CMP12 is determined by the resistors R14, R15 and R16.

That is, the steering force determination value V1 is represented by the following formula.

$$V1 = R15/(R14+R15) \times Vcc \quad (4)$$

The operation of the motor drive direction restricting circuit 25 will be described with reference to FIG. 5 in more detail.

In the drawing, LL shows the characteristics of the leftward steering force determination level and RL shows the characteristics of the rightward steering force determination level. A motor drive permission region is located from LL to RL, the region above LL is a motor leftward drive prohibition region and the region below RL is a motor rightward drive prohibition region.

The relationship between the steering force determination values V1, V2, V3 and V4 as the steering force determination level is V2<V3<0<V4<V1, steering torque<0 means leftward steering, steering torque>0 means rightward steering and steering torque=0 means neutral.

The leftward steering force determination level is determined by the leftward steering force discrimination level determination unit 254 based on the output from the leftward torque comparison unit 252 and when the output from the leftward torque comparison unit 252 is in a permission state, the leftward steering force determination value is V1 and when it is in a prohibition state, the leftward steering force determination value is V3.

The rightward steering force determination level is determined by the rightward steering force discrimination level determination unit 253 based on the output from the rightward torque comparison unit 251 and when the output from the rightward torque comparison unit 251 is in the permission state, the rightward steering force determination value is V2 and when it is in the prohibition state, the rightward steering force determination value is V4.

When a steering force is equal to or below the rightward steering force determination value V2 or V4, the rightward torque comparison unit 251 outputs a motor rightward drive prohibition signal to the AND circuits 26a and 26b. On the contrary, when a steering force exceeds the rightward steering force determination value V2 or V4, the rightward torque comparison unit 251 outputs a motor rightward drive permission signal to the AND circuits 26a and 26b.

This is also applicable to the operation of the leftward torque comparison unit 252 and leftward steering force discrimination level determination unit 254.

The electrically-driven power steering control apparatus assists and urges steering wheel operation and restricts the value sensed by the steering torque sensor 1 equal to or below a predetermined level.

Figure 5:
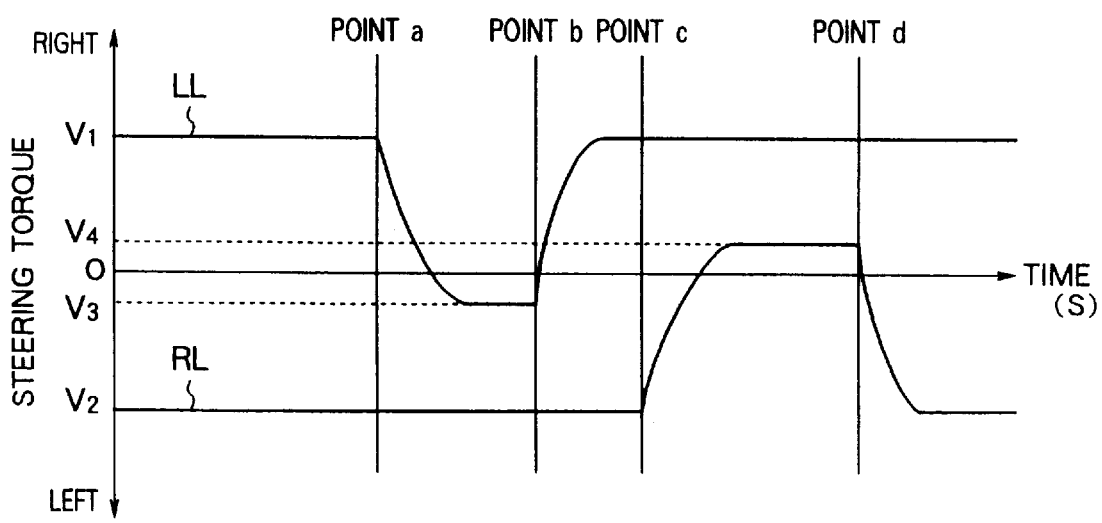
FIG. 5 is a view explaining the operation of the embodiment 1 of the vehicle control apparatus according to the present invention.

In FIG. 5, since the steering force determination values V1 and V2 are set larger than the predetermined level, when a steering torque, which is generated when a motor output is in an abnormal state, exceeds the steering force determination values V1 and V2, a motor drive direction is restricted.

In the motor drive direction restricting circuit 25, when, for example, a steering torque exceeds the leftward steering force determination value V1 at a point a in rightward steering operation, the leftward steering force determination value V1 changes to V3. As a result, it is prohibited to drive the motor leftward so long as a steering torque is on the right side.

Further, when the motor is to be driven leftward, a steering torque must be generated on the left side and equal to or less than the leftward steering force determination value V3 (point b). At the time, the leftward steering force determination level returns from the leftward steering force determination value V3 to V1. That is, the leftward steering force determination level has such hysteresis characteristics that when a steering torque exceeds the leftward steering force determination value V1, the determination level changes to V3, whereas when a steering torque is equal to or less than the leftward steering force determination value V3, it returns to V1.

This is also applicable to a rightward steering force determination value in the same way and when a steering torque changes exceeding the rightward steering force determination value V2 in leftward steering operation (point c), a rightward steering force determination level changes from the rightward steering force determination value V2 to V4. As a result, it is prohibited to drive the motor rightward so long as the steering torque is on the left side.

Further, when the motor is to be driven rightward, a steering torque must be generated on the right side and exceed the rightward steering force determination value V4 (point d). At the time, the rightward steering force determination level returns from the rightward steering force determination value V4 to V2. That is, when the steering torque exceeds a steering force determination criterion, the motor is permitted to be driven only in the motor drive direction determined from the steering torque. Consequently, even if an abnormal motor drive signal is output by the runaway of the CPU 22, the safety of the system is secured because the motor drive direction is restricted.

Figure 4:
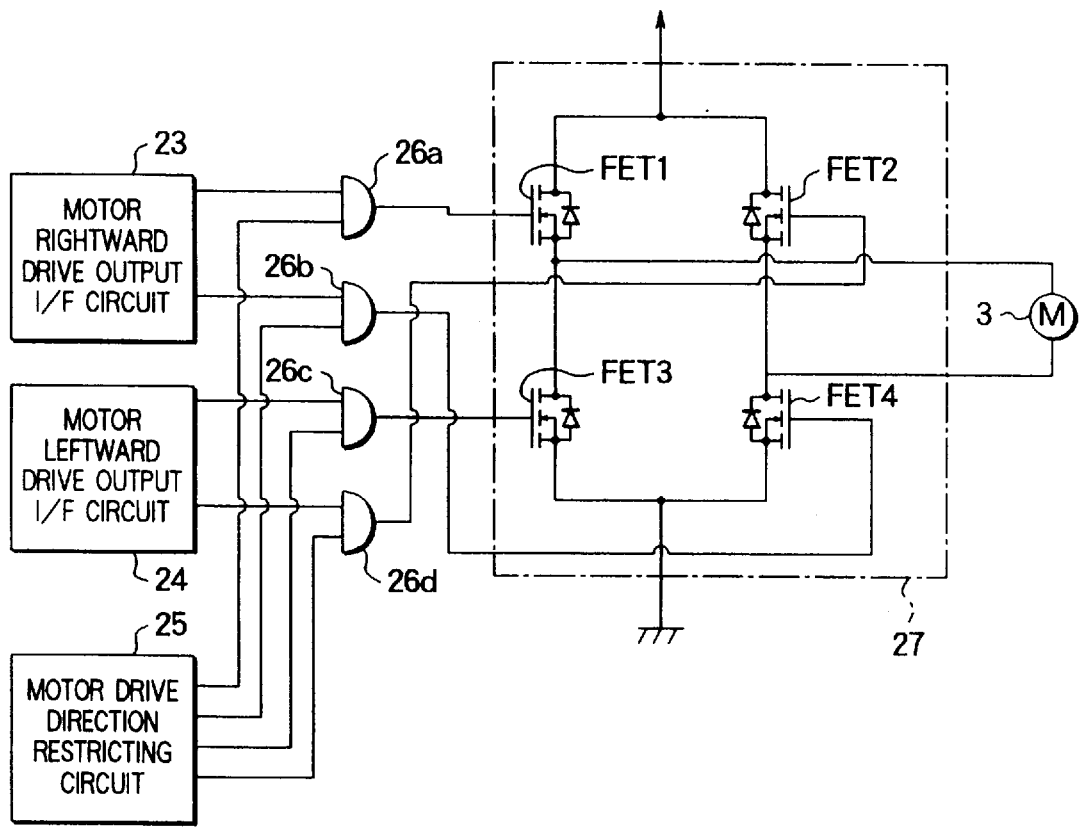
FIG. 4 a circuit diagram showing another main portion of the embodiment 1 of the vehicle control apparatus according to the present invention.

FIG. 4 is a circuit diagram showing an example of the specific circuit arrangement of the motor drive circuit 27.

In the drawing, the motor drive circuit 27 constitutes a bridge circuit by four field effect transistors (hereinafter, referred to as FET) 1–4. When, for example, only the FET 4 is fixed to an off state by the motor drive direction restricting circuit 25 in the state that a motor current flows in the sequence of the FET 1, the motor 3 and the FET 4, the FET 1 is turned on. Therefore, when the motor 3 is driven by steering wheel operation, a regenerative current flows in the sequence of the motor 3, the parasitic diode of the FET 2 and the FET 1 so that a braking force is applied to make the steering wheel operation heavy.

However, when the upper and lower stage FETs are turned off as shown in FIG. 4, the regenerative current does not flow and no braking force is applied to the motor. That is, the FETs 1–4 can be turned off regardless of the output levels of the I/F circuits 23 and 24 by turning off the output from the motor drive direction restricting circuit 25, whereby the regenerative current does not flow so that no braking force is applied to the motor.

With this arrangement, even if the motor is driven in an abnormal state, steering wheel operation can be carried out with a steering force near to that in manual operation to thereby prevent the increase of a difference between a rightward steering wheel operating force and a leftward steering wheel operating force.

Further, since the motor drive direction restricting means restricts the operation of a pair of the transistors of the bridge circuit, a braking force is prevented from being applied by a regenerative current flowing to the motor, so that the increase of the difference between the rightward steering wheel operating force and the leftward steering wheel operating force can be prevented when a motor drive direction is restricted by the motor drive direction restricting means.

Embodiment 2

Figure 6:
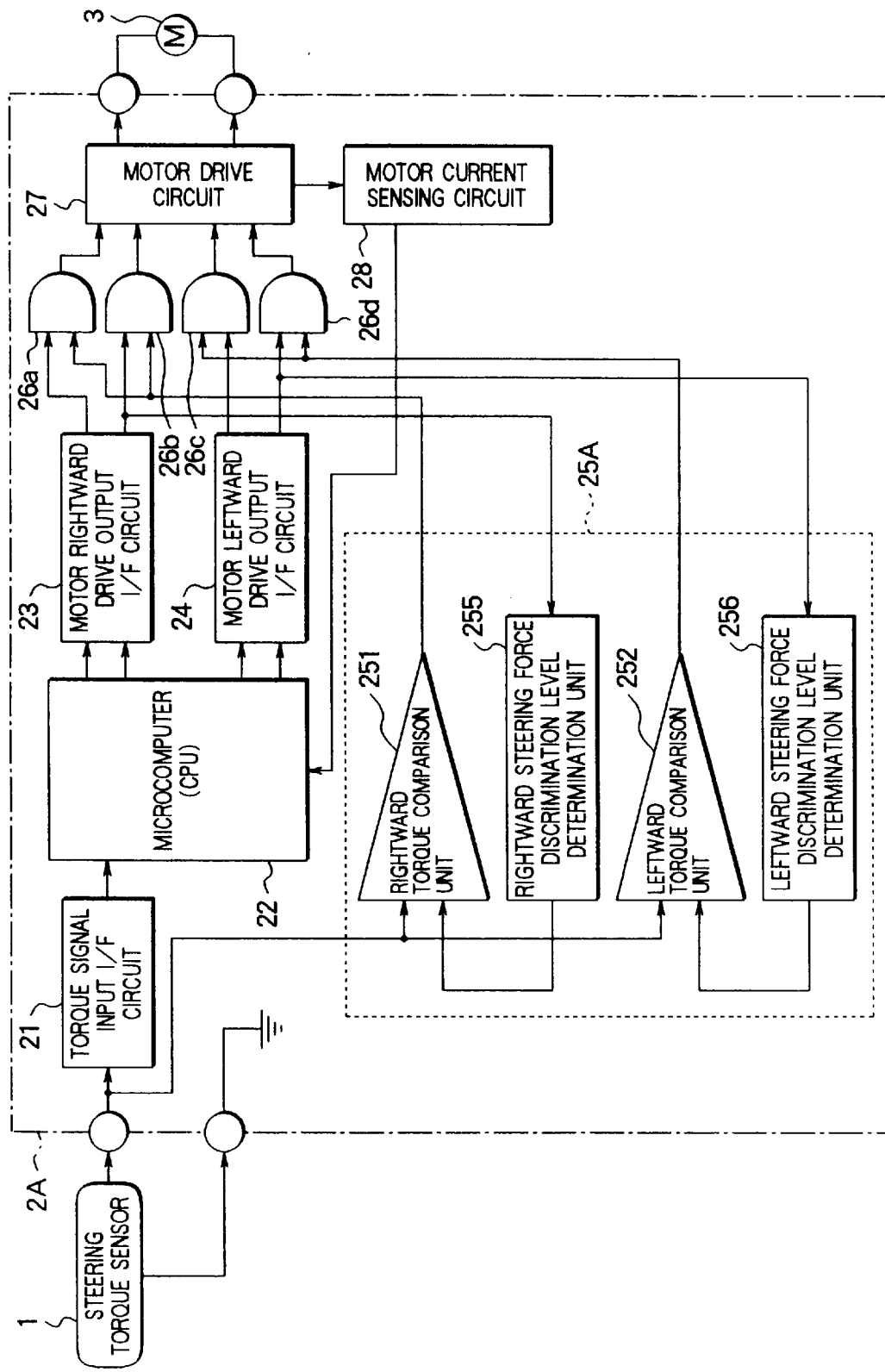
FIG. 6 is a block diagram showing the arrangement of an embodiment 2 of the vehicle control apparatus according to the present invention.

FIG. 6 is a circuit diagram showing the arrangement of an embodiment 2 of the present invention. In the drawing, the same numerals as used in FIG. 1 are used to denote components corresponding to those in FIG. 1 and the detailed description thereof is omitted.

A motor drive direction restricting circuit 25A in a controller 2A inputs the signal from a steering torque sensor 1 to a rightward torque comparison unit 251 and a leftward torque comparison unit 252. The rightward torque comparison unit 251 compares the rightward steering force determination level determined by a rightward steering force discrimination level determination unit 255 with the signal from the steering torque sensor 1 and restricts the rightward drive of a motor depending upon the result of comparison. Further, the leftward torque comparison unit 252 compares the leftward steering force determination level determined by a leftward steering force discrimination level determination unit 256 with the signal from the steering torque sensor 1 and restricts the leftward drive of the motor depending upon the result of comparison.

The rightward steering force determination level determined by the rightward steering force discrimination level determination unit 255 is determined based on the result of the output from a motor rightward drive output I/F circuit 23. Further, the leftward steering force determination level determined by the leftward steering force discrimination level determination unit 256 is determined based on the result of the output from a motor leftward drive output I/F circuit 24.

Note, the rightward steering force determination level determined by the rightward steering force discrimination level determination unit 255 may be determined based on the signal output from a CPU 22 to the motor rightward drive output I/F circuit 23. Likewise, the leftward steering force determination level determined by the leftward steering force discrimination level determination unit 256 may be determined based on the signal output from the CPU 22 to the motor leftward drive output I/F circuit 24.

Next, overall operation will be described.

When an output from the steering torque sensor 1 is supplied to the CPU 22 through the torque signal input I/F circuit 21, the CPU 22 determines a motor drive direction and a target motor current value based on the torque signal from the torque signal input I/F circuit 21. When a rightward torque is generated, the motor drive direction is a right direction and when a leftward torque is generated, the motor drive direction is a left direction.

Further, the CPU 22 determines a motor output value from a difference between the motor current value sensed by the motor current sensing circuit 28 and the target motor current value and outputs the motor output value to the motor rightward drive output I/F circuit 23 or motor leftward drive output I/F circuit 24.

When a motor rightward drive signal and the motor output value are input to the motor rightward drive output I/F circuit 23 from the CPU 22, the motor rightward drive output I/F circuit 23 outputs a motor rightward drive output signal to the AND circuits 26a and 26b.

Likewise, when a motor leftward drive signal and the motor output value are input to the motor leftward drive output I/F circuit 24 from the CPU 22, the motor leftward drive output I/F circuit 24 outputs a motor leftward drive output signal to the AND circuits 26c and 26d.

The motor drive direction restricting circuit 25A restricts the motor drive direction based on the result of the output from the motor rightward drive output I/F circuit 23, the result of the output from the motor leftward drive output I/F circuit 24 and the output from the steering torque sensor 1.

Figure 7:
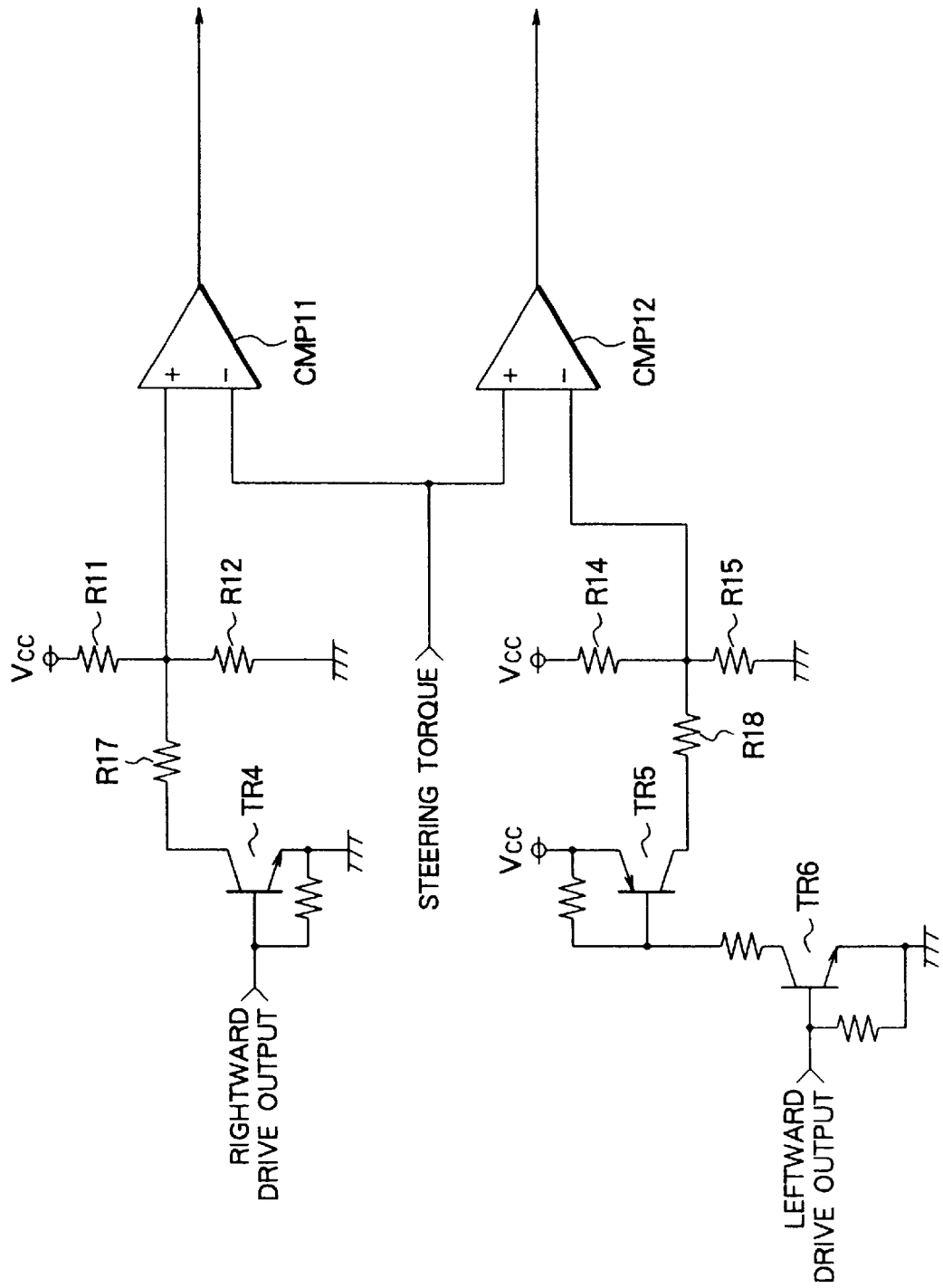
FIG. 7 is a circuit diagram showing a main portion of the embodiment 2 of the vehicle control apparatus according to the present invention.

FIG. 7 a circuit diagram showing an example of the specific circuit arrangement of the motor drive direction restricting circuit 25A. Note, in the drawing, the same numerals as used in FIG. 3 are used to denote components corresponding to those in FIG. 3 and the detailed description thereof is omitted.

In the drawing, the comparator CMP11 constituting the rightward torque comparison unit 251 has a non-inverting input terminal connected to the node where voltage dividing resistors R11 and R12, which are connected between a power supply terminal Vcc and the ground, are connected. Further, the collector of a transistor TR4 is connected through a resistor R17 to the node where the voltage dividing resistors R11 and R12 are connected, the output of the motor rightward drive output I/F circuit 23 is supplied to the base of the transistor TR4 and the emitter thereof is grounded. The inverting input terminal of the comparator CMP11 is supplied with the steering torque from the steering torque sensor 1.

The components other than the comparator CMP11 constitute the rightward steering force discrimination level determination unit 255.

Likewise, the comparator CMP12 constituting the leftward torque comparison unit 252 has an inverting input terminal connected to the node where voltage dividing resistors R14 and R15, which are connected between the power supply terminal Vcc and the ground, are connected.

The non-inverting input terminal of the comparator CMP12 is supplied with the steering torque from the steering torque sensor 1.

Further, the collector of a transistor TR5 is connected through a resistor R18 to the node where the voltage dividing resistors R14 and R15 are connected, the emitter of the transistor TR5 is connected to the power supply terminal Vcc and the base thereof is connected to the collector of a transistor TR6 at a previous stage through a resistor. The output of the motor leftward drive output I/F circuit 24 is supplied to the base of the transistor TR6 and its emitter is grounded. The components other than the comparator CMP 12 constitute the leftward steering force discrimination level determination unit 256.

The comparator CMP11 compares the level of the non-inverting input terminal with the level of the inverting input terminal. That is, the comparator CMP11 compares the output from the rightward steering force discrimination level determination unit 255 with the level of output from the steering torque sensor 1 and when the level of the non-inverting input terminal is larger than the level of the inverting input terminal, the comparator CMP11 outputs the high level "H", whereas when the level of the non-inverting input terminal is smaller than the level of the inverting input terminal, it outputs the low level "L".

When the output from the comparator CMP11 is at the high level "H", motor rightward drive is prohibited. Further, since the transistor TR4 is turned on when the output from the motor rightward drive output I/F circuit 23 is at the high level "H", the level of the non-inverting input terminal of the comparator CMP11, that is, the steering force determination value V4 (refer to FIG. 8) supplied from the rightward steering force discrimination level determination unit 255 to the comparator CMP11 is determined by the resistors R11, R12 and R17.

When the output from the comparator CMP1 1 is at the low level "L", motor rightward drive is permitted. Further, since the transistor TR4 is turned off when the output from the motor rightward drive output I/F circuit 23 is at the low level "L", the level of the non-inverting input terminal of the comparator CMP11, that is, the steering force determination value V2 (refer to FIG. 8) supplied from the rightward steering force discrimination level determination unit 255 to the comparator CMP11 is determined by the resistors R11, R12.

The comparator CMP12 compares the level of the inverting input terminal with the level of the non-inverting input terminal. That is, the comparator CMP12 compares the output from the leftward steering force discrimination level determination unit 256 with the level of the output from the steering torque sensor 1 and when the level of the inverting input terminal is larger than the level of the non-inverting input terminal, the comparator CMP12 outputs the low level "L", whereas when the level of the inverting input terminal is smaller than the level of the non-inverting input terminal, the comparator CMP12 outputs the high level "H"

When the output from the comparator CMP12 is at the high level "H", motor leftward drive is prohibited. Further, since the transistors TR6 and TR5 are turned on together when the output from the motor leftward drive output I/F circuit 24 is at the high level "H", the level of the inverting input terminal of the comparator CMP12, that is, the steering force determination value V3 (refer to FIG. 8) supplied from the leftward steering force discrimination level determination unit 256 to the comparator CMP12 is determined by the resistors R14, R15 and R18.

When the output from the comparator CMP12 is at the low level "L", the motor leftward drive is permitted. Further, since the transistors TR6 and TR5 are turned off together when the output from the motor leftward drive output I/F circuit 24 is at the low level "L", the level of the inverting input terminal of the comparator CMP12, that is, the steering force determination value V1 (refer to FIG. 8) supplied from the leftward steering force discrimination level determination unit 256 to the comparator CMP12 is determined by the resistors R14, R15.

The operation of the motor drive direction restricting circuit 25A will be described with reference to FIG. 8 in more detail.

In the drawing, LL shows the characteristics of the leftward steering force determination level and RL shows the characteristics of the rightward steering force determination level. A motor drive permission region ranges from LL to RL, the region above LL is a motor left drive prohibition region and the region below RL is a motor right drive prohibition region.

The relationship between the steering force determination values V1, V2, V3 and V4 as the steering force determination level is V2<V3<0<V4<V1, steering torque<0 means leftward steering, steering torque>0 means rightward steering and steering torque=0 means neutral.

RD shows the output from the motor rightward drive output I/F circuit 23 (motor rightward drive signal) and LD shows the output from the motor leftward drive output I/F circuit 24 (motor leftward drive signal) and they represent motor drive stop (OFF) at the high level "H" and motor drive (ON) at the low level.

For example, when a leftward steering torque is sensed and the motor leftward drive signal LD is turned on (point e), the leftward steering force determination value V1 changes to V3. As a result, when a steering torque changes exceeding the leftward steering force determination value V3 in the state that the motor leftward drive signal LD output from the motor leftward drive output I/F circuit 24 is turned on, the leftward torque comparison unit 252 outputs a motor leftward drive prohibition signal to one of the input terminals of each of the AND circuits 26c, 26d, respectively.

When the input signal coincides with the output from the motor leftward drive output I/F circuit 24 which is supplied to the other input terminal of each of the AND circuits 26c, 26d, that is, a motor leftward drive signal, the AND circuit 26c, 26d drive the motor 3 leftward by the motor drive circuit 27.

Further, when the motor leftward drive signal LD output from the motor leftward drive output I/F circuit 24 is turned off (point f), the steering force determination level returns from the leftward steering force determination value V3 to V1 to release the motor leftward drive restriction. This is also applied likewise when the motor rightward drive signal RD output from the motor rightward drive output I/F circuit 23 is turned on (point g) and when the motor rightward drive signal RD is turned on (point g), the rightward steering force determination level V2 changes to V4. As a result, when a steering torque changes equal to or less than V4 in the state that the motor rightward drive signal RD is turned of, the rightward torque comparison unit 251 outputs a motor rightward drive prohibition signal to one of the input terminals of each of the AND circuits 26a, 26b.

When the input prohibition signal coincides with the output from the motor rightward drive output I/F circuit 23 which is supplied to the other input terminal of each of the AND circuits 26a, 26b, that is, a motor rightward drive signal, the AND circuits 26a, 26b drive the motor 3 rightward by the motor drive circuit 27.

Further, when the motor rightward drive signal RD is turned off (point h), the steering force determination level returns from V4 to V2 to release the motor rightward drive restriction.

With this operation, a motor drive region corresponding to a motor drive state can be set and when a steering torque outside the motor drive region is sensed, a motor drive direction is restricted. Thus, safety is secured and reliability is improved. Further, when the a motor drive restricting direction is released, since a motor output is stopped, even if the restriction made by motor drive direction restricting means is released, the motor is not driven and safety is secured.

This method has a feature that the direction in which the motor can be driven is fixed by the motor drive signals RD and LD.

Figure 8:
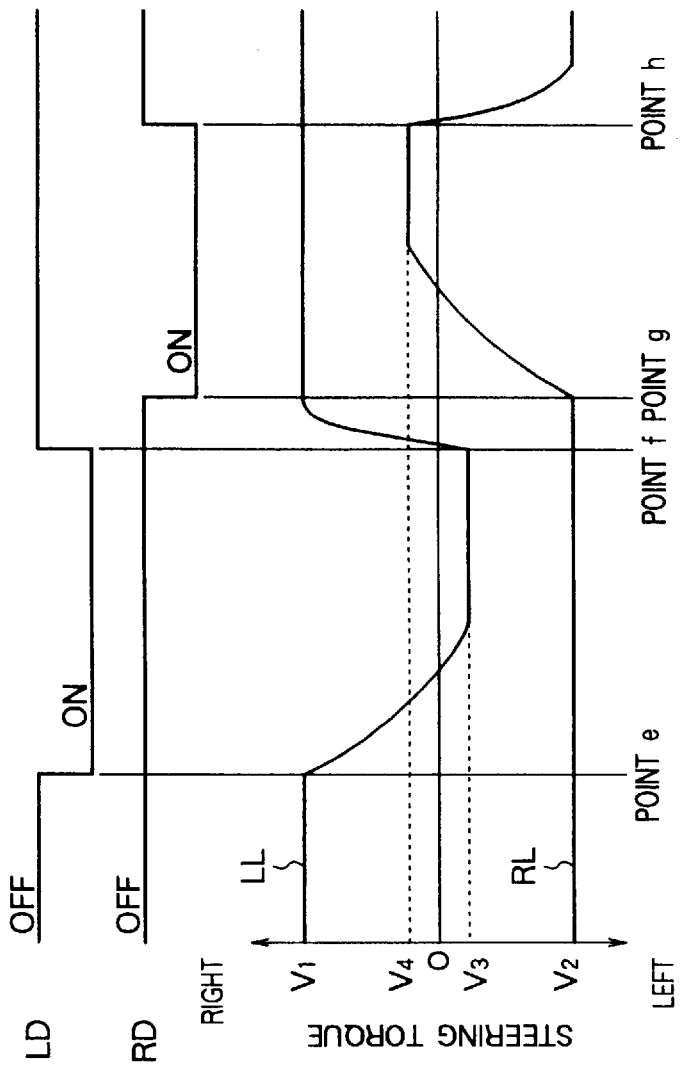
FIG. 8 is a view explaining the operation of the embodiment 2 of the vehicle control apparatus according to the present invention.

Further, when the state of the motor drive signal (RD, LD) is switched in FIG. 8, the steering force determination level changes beyond a neutral level. That is, when the motor drive means changes to a motor drive state or the motor drive direction restricting circuit changes to a motor drive direction restricting state, the steering force determination level changes beyond the neutral level of a steering force.

With this operation, when a steering wheel is released in the state that a motor dive direction is fixed leftward due to, for example, an abnormal motor output from the CPU 22, a steering torque is made neutral. Since a steering force determination value is has a value beyond neutral (V3), motor leftward drive is prohibited in the neutral steering torque. That is, even if a motor output is made abnormal when the steering wheel is released, inconvenience such as the self-turn of the steering wheel and the like is not caused.

In FIG. 8, when the motor is not driven, the steering force determination level is set by the steering force determination values V1 and V2. That is, the steering force determination level is set to a level for releasing the restriction made by the motor drive direction restricting circuit.

With this arrangement, when the motor drive direction is restricted in the state that the motor is not driven (motor output is stopped because a steering torque is neutral), even if the motor is driven in the restricted direction, steering operation may be not assisted by the motor because the motor drive direction is restricted (steering wheel operation is made heavy). For example, when the steering force determination value is set to V3 or V4 in the state that the motor is not driven, a motor drive prohibition region is set between V3 and V4 (same as a neutral prohibition method) and the motor may be difficult to be smoothly driven. However, since the steering force determination level is set by the steering force determination values V1 and V2 as described above when the motor is not driven, such a problem is not caused.

In FIG. 8, when the motor is not driven, V1 and V2 are set as the steering force determination values. That is, when the restriction of the motor drive direction is released by the motor drive direction restricting circuit, the steering force determination level is set larger than a predetermined value. With this arrangement, when a motor current control is effected to feed a braking current to slow the turn speed of the steering wheel, a direction in which a steering torque is generated is opposite to a motor drive direction. However, since the steering force determination value V1 or V2 is set larger than a torque generated at the time, a motor output is permitted and redundancy is provided with the motor current control. For example, V1 is set to a value exceeding a rightward steering torque of 30 kgfcm and V2 is set to a value exceeding a leftward steering torque of 30 kgfcm.

As described above, according to this embodiment, since the steering force determination level changes with a predetermined delay element with respect to the change of state of the motor drive means as well as is kept to a predetermined level corresponding to the state of the motor drive means, the restriction of the motor drive direction is not released until motor drive is set to a stop state. Consequently, safety is improved because a motor output is not permitted unless the polarity of a motor drive direction coincides with the polarity of a steering torque.

Since the steering force determination level changes beyond the neutral level of a steering force when the motor drive means changes to a motor drive state or the motor drive direction restricting means changes to a motor drive direction restricting state, the self-turn of the steering wheel is prevented when it is released from a hand in an abnormal motor output.

When the motor is not driven, since the steering force determination level is set to the level at the time when the restriction made by the motor drive direction restricting means is released, a sufficient assisting force can be obtained from the balance with the delay of change of the steering force determination level when the motor is drive and steering feel is improved.

Further, since the steering force determination level is set larger than the predetermined value when the restriction of the motor drive direction made by the motor drive direction restricting means is released, a motor drive neutral permission region can be set wide as well as when the steering force determination level is set by H/W, a resistor and the like do not require accuracy. In addition, since the neutral permission region can be set wide, an assisting force needed when the steering wheel starts to be cut, a braking force for suppressing the turn speed of the steering wheel and the like can be controlled.

Embodiment 3

Figure 9:
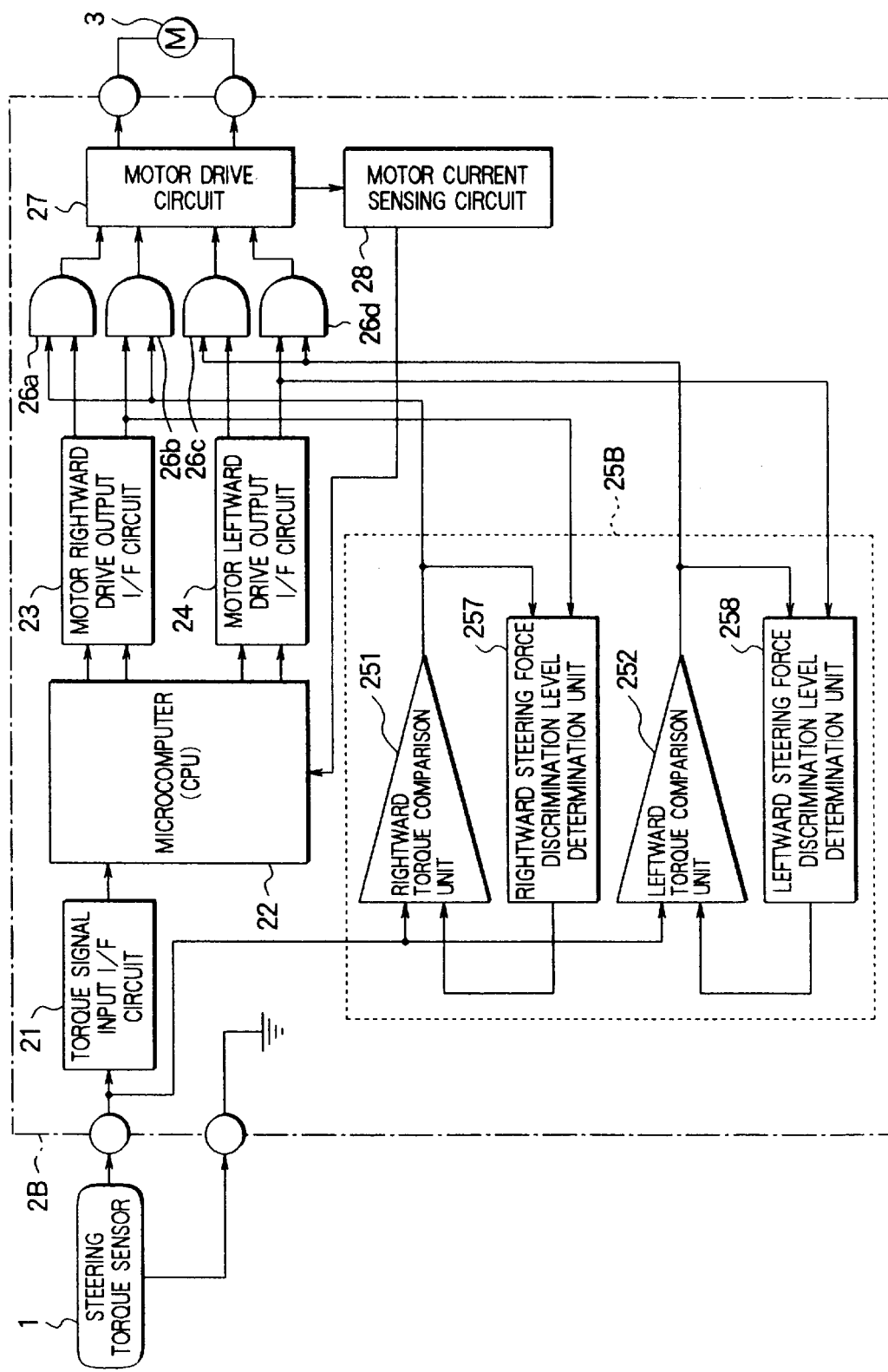
FIG. 9 is a block diagram showing the arrangement of an embodiment 3 of the vehicle control apparatus according to the present invention.

FIG. 9 is a circuit diagram showing the arrangement of an embodiment 3 of the present invention. In the drawing, the same numerals as used in FIG. 1 are used to denote components corresponding to those in FIG. 1 and the detailed description thereof is omitted.

A motor drive direction restricting circuit 25B in a controller 2B inputs the signal from a steering torque sensor 1 to a rightward torque comparison unit 251 and a leftward torque comparison unit 252. The rightward torque comparison unit 251 compares the rightward steering force determination level determined by a rightward steering force discrimination level determination unit 257 with the signal from the steering torque sensor 1 and restricts the rightward drive of a motor based on the result of comparison.

Further, the leftward torque comparison unit 252 compares the leftward steering force determination level determined by a leftward steering force discrimination level determination unit 258 with the signal from the steering torque sensor 1 and restricts the leftward drive of the motor based on the result of comparison.

The rightward steering force determination level determined by the rightward steering force discrimination level determination unit 257 is determined based on the result of the output from the rightward torque comparison unit 251 and output from a motor rightward drive output I/F circuit 23. Further, the leftward steering force determination level determined by the leftward steering force discrimination level determination unit 258 is determined based on the result of the output from the leftward torque comparison unit 252 and the output from a motor leftward drive output I/F circuit 24.

Note, although an example of the specific arrangement of the motor drive direction restricting circuit 25B is not shown, it may be composed of the circuit in FIG. 3 and the circuit in FIG. 7 in combination.

Further, the rightward steering force determination value determined by the rightward steering force discrimination level determination unit 257 may be determined based on the signals output from the rightward torque comparison unit 251 and a CPU 22 to the motor rightward drive output I/F circuit 23. Likewise, the leftward steering force determination value determined by the leftward steering force discrimination level determination unit 258 may be determined based on the signals output from the leftward torque comparison unit 252 and the CPU 22 to the motor leftward drive output I/F circuit 24.

Next, operation will be described.

Figure 10:
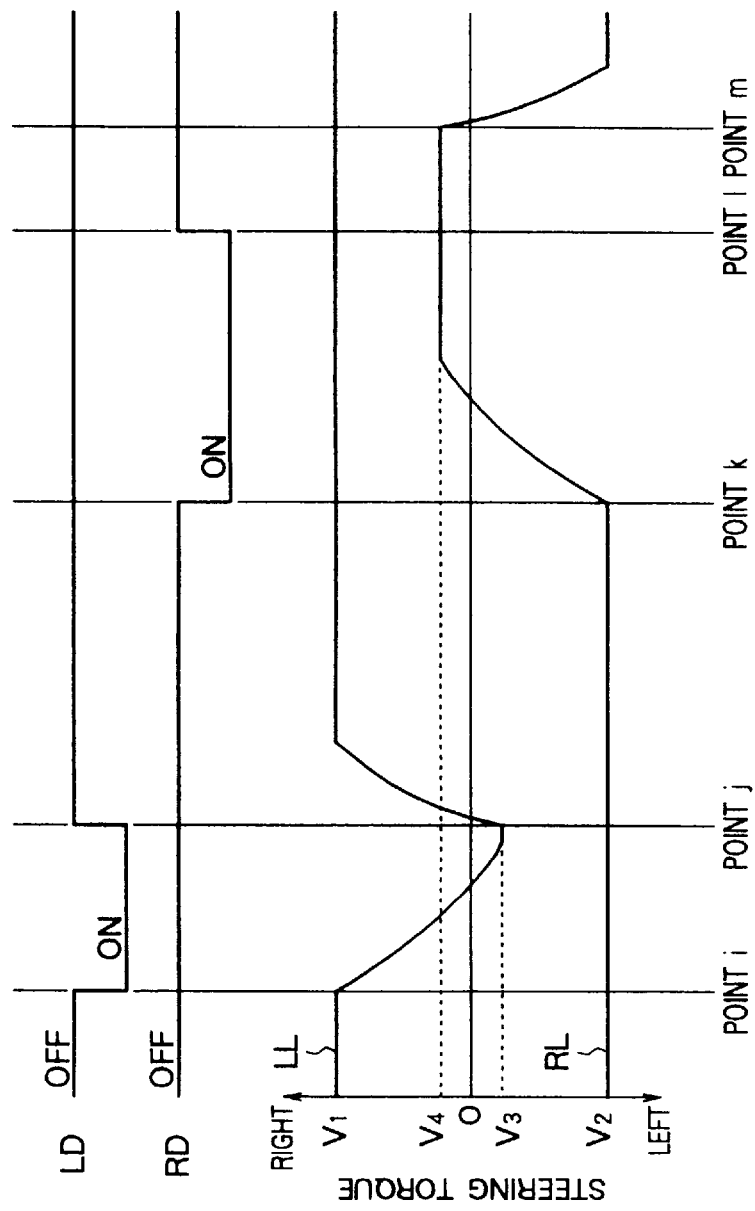
FIG. 10 is a view explaining the operation of the embodiment 3 of the vehicle control apparatus according to the present invention.

Note, since overall operation is substantially the same as those of FIG. 1 and FIG. 6, the description thereof is omitted and only the portions different from the aforesaid, that is, the operation of the motor drive direction restricting circuit 25B will be described with reference to FIG. 10.

In the drawing, LL shows the characteristics of the leftward steering force determination level and RL shows the characteristics of the rightward steering force determination level. A motor drive permission region ranges from LL to RL, the region above LL is a motor left drive prohibition region and the region below RL is a motor right drive prohibition region. The relationship between the steering force determination values V1, V2, V3 and V4 is V2<V3<0<V4<V1, steering torque<0 means leftward steering, steering torque>0 means rightward steering and steering torque=0 means neutral.

RD shows the output from the motor rightward drive output I/F circuit 23 (motor rightward drive signal) and LD shows the output from the motor leftward drive output I/F circuit 24 (motor leftward drive signal) and they represent motor drive stop (OFF) at the high level "H" and motor drive (ON) at the low level.

For example, when a leftward steering torque is sensed and the motor leftward driving signal LD is turned on (point i), the leftward steering force determination value V1 changes to V3. As a result, when a steering torque changes exceeding the leftward steering force determination value V3 in the state that the motor leftward drive signal LD output from the motor leftward drive output I/F circuit 24 is turned on, the leftward torque comparison unit 252 outputs a motor leftward drive prohibition signal to one of the input terminals of each of AND circuits 26c, 26d, respectively.

When the input prohibition signal coincides with the output from the motor leftward drive output I/F circuit 24 which is supplied to the other input terminal of each of the AND circuits 26c, 26d, that is, a motor leftward drive signal, the AND circuits 26c, 26d drive the motor 3 leftward by the motor drive circuit 27.

Further, when the motor leftward drive signal LD output from the motor leftward drive output I/F circuit 24 is turned off (point j), the steering force determination level returns from V3 to V1 unless a motor leftward drive direction is not restricted by the leftward torque comparison unit 252. This is also applied likewise when the motor rightward drive signal RD output from the motor rightward drive output I/F circuit 23 is turned on (point k) and when the motor rightward drive signal RD is turned on (point k), the rightward steering force determination level V2 changes to V4. As a result, when a steering torque changes equal to or less than V4 in the state that the motor rightward drive signal RD is turned on, the rightward torque comparison unit 251 outputs a motor rightward drive prohibition signal to one of the input terminals of each of AND circuits 26a and 26b.

When the input prohibition signal coincides with the output from the motor rightward drive output I/F circuit 23 which is supplied to the other input terminal of each of the AND circuits 26a, 26b, that is, a motor rightward drive signal, the AND circuits 26a, 26b drive the motor 3 rightward by a motor drive circuit 27.

Further, when the motor rightward drive signal RD is turned off (point l), the steering force determination level does not return from V4 to V2 unless the restriction against a motor drive direction made by the rightward torque comparison unit 251 is not released and it returns from V4 to V2 after the restriction of the motor drive direction made by the rightward torque comparison unit 251 is released.

As described above, since this embodiment enables a motor drive region corresponding to a motor drive state to be set and restricts a motor drive direction when a steering torque outside the motor drive region is sensed, safety is secured and reliability is improved. Further, even if the motor is stopped, the steering force determination level does not return to its original value unless the motor drive direction is restricted by the motor drive direction restricting circuit and thus the motor drive direction is kept in the restricted state. With this operation, since the motor is securely restricted, the safety of the system can be improved.

That is, a motor drive prohibition region can be set corresponding to a motor drive state, safety is secured and reliability is improved. Since a motor output is stopped when a motor drive restricting direction being kept is released, the motor is not driven when the restriction made by the motor drive direction restricting means is released. Further, since the motor output prohibition region is fixed until a motor drive state and steering torque return to their normal states, the safety of the system can be improved.

Embodiment 4

Figure 11:
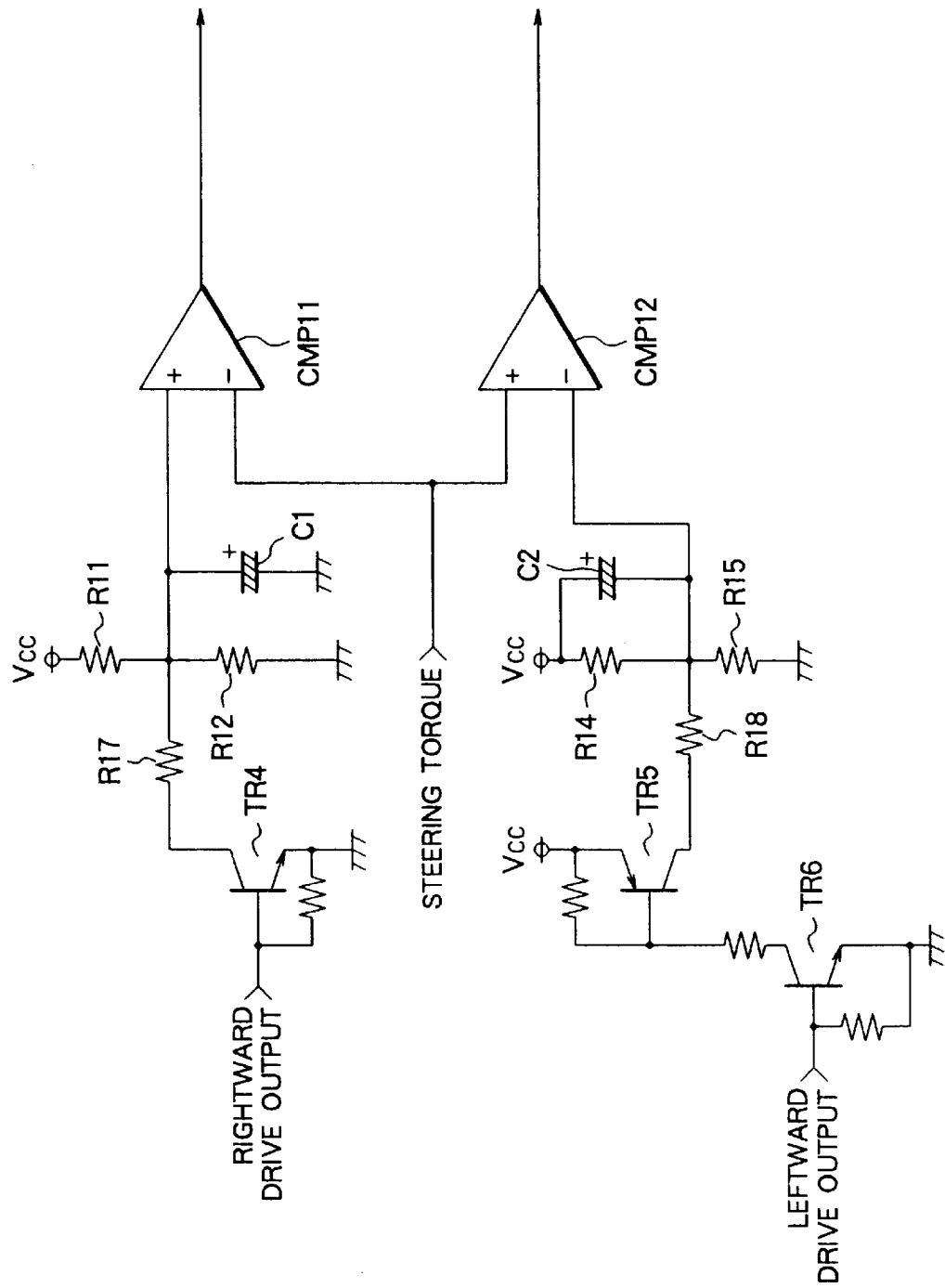
FIG. 11 a circuit diagram showing a main portion of an embodiment 4 of the vehicle control apparatus according to the present invention.

FIG. 11 is a circuit diagram showing the arrangement of the main portion of an embodiment 4 of the present invention.

Since the overall circuit of this embodiment is similar to that shown in FIG. 6, FIG. 11 shows only an example of the specific circuit arrangement of a motor drive direction restricting circuit 25A which is a circuit arrangement characteristic to this embodiment. Note, in the drawing, the same numerals as used in FIG. 7 are used to denote components corresponding to those in FIG. 7 and the detailed description thereof is omitted.

This embodiment is arranged such that a delay is provided with the change of a steering force determination level so that when a steering wheel is turned while released from a hand, a motor is controlled to restrict the turn of the steering wheel.

To achieve the above control, a capacitor C1 is connected in parallel with a resistor R12 as one of dividing resistors connected between the non-inverting input terminal of a comparator CMP11 constituting a rightward torque comparison unit 251 and the ground, that is, between a power supply terminal Vcc and the ground.

The components other than the comparator CMP11 constitute a rightward steering force discrimination level determination unit 255.

Likewise, a capacitor C2 is connected in parallel with a resistor R14 as one of dividing resistors connected between the inverting input terminal of a comparator CMP12 constituting a leftward torque comparison unit 252 and the ground, that is, between the power supply terminal Vcc and the ground.

The components other than the comparator CMP12 constitutes a leftward steering force discrimination level determination unit 256.

Since a transistor TR4 is turned on when the output from a motor rightward drive output I/F circuit 23 is at the high level "H", the level of the non-inverting input terminal of the comparator CMP11, that is, the steering force determination value V2 supplied from the rightward steering force discrimination level determination unit 255 to the comparator CMP11 is determined by the resistors R11, R12 and R17.

When it is assumed that the resistance values of the resistors and the power supply voltage of the power supply terminal are represented by the same numerals as those of these components, the steering force determination value V2 is represented by the following formula.

$$V2 = \{R12 \cdot R17/(R12 + R17)\}/[\{R12 \cdot R17/(R12 + R17)\} + R11] \times Vcc \quad (5)$$

Since the transistor TR4 is turned off when the output from the motor rightward drive output I/F circuit 23 is at the low level "L", the level of the non-inverting input terminal of the comparator CMP11, that is, the steering force determination value V4 supplied from the rightward steering force discrimination level determination unit 255 to the comparator CMP11 is determined by the resistors R11 and R12. That is, the steering force determination value V4 is represented by the following formula.

$$V4 = R12/(R11+R12) \times Vcc \quad 6)$$

where, V4>V2.

When it is assumed that the time constant (discharge) of the capacitor C1 is $T_1$ when the transistor TR4 is turned on and the time constant (charge) thereof is $T_2$ when the transistor TR4 is turned off, the charge/discharge time constant of the capacitor C1 is determined by the following formula.

$$T_1 = C1 \times R11\ R12\|R17 \quad (7)$$

$$T_2 = C1 \times R11\|R12 \quad (8)$$

where, C1 is the capacitance value of the capacitor C1 and ∥ shows that the respective resistors are connected in parallel with each other in the above formulas.

Next, operation will be described with reference to FIG. 12 and FIG. 13.

Figure 12:
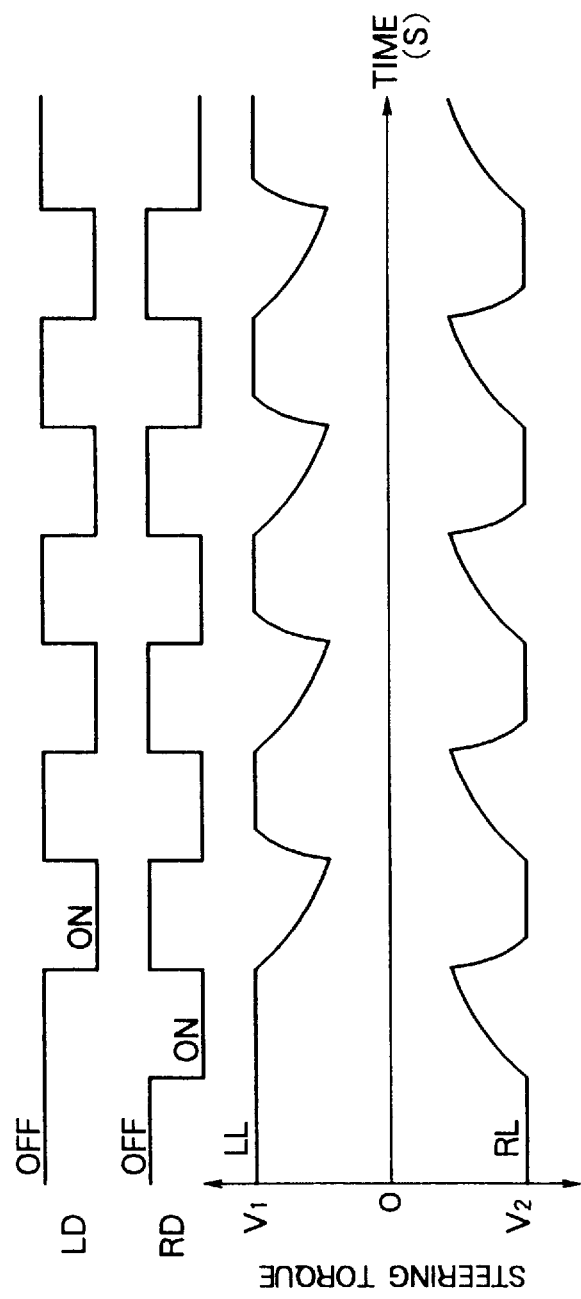
FIG. 12 is a view explaining the operation of the embodiment 4 of the vehicle control apparatus according to the present invention.

FIG. 12 explains the operation executed when the time constant of the steering force determination level which changes when motor drive signals RD, LD are turned on is delayed with respect to the time constant of the steering force determination level which changes when the motor drive signals RD, LD are turned off.

FIG. 12 shows the characteristics of steering force determination levels LL and RL when the motor drive signals RD and LD are alternately output.

The time constant of the change of the characteristics LL and RL of the steering force determination level is different depending upon whether the motor drive signals RD, LD are turned on or off. Therefore, in the case of the characteristics LL of the leftward steering force determination level, for example, the leftward steering force determination value only changes up to a certain value between 0 and V1 and further changes depending upon the frequency of the motor drive signal LD. That is, when the frequency is higher, the leftward steering force determination value has a value near to V1. More specifically, when steering operation is repeated at a high speed, a motor drive permission range (between LL and RL) is widened in accordance with a steering frequency. With this arrangement, the malfunction of the motor drive direction restricting circuit 25A can be prevented and further the delay of phase of a motor current and a steering torque can be corrected without being disturbed by the motor drive direction restricting circuit 25A. As a result, it can be said that the motor can be controlled with redundancy.

Figure 13:
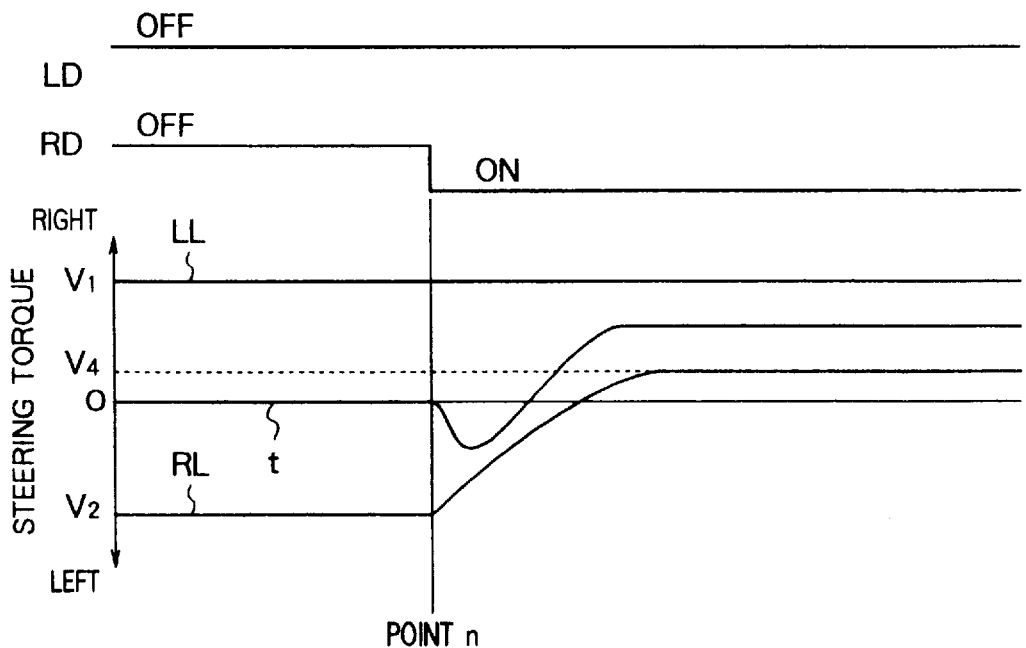
FIG. 13 is a view explaining the operation of the embodiment 4 of the vehicle control apparatus according to the present invention.

FIG. 13 explains why the steering force determination level must be delayed when the motor drive signals LL, RL are turned on.

For example, when the steering wheel turns while being released from a hand, the motor may be driven to restrict the turn of the steering wheel. In such as case, a steering torque is generated in an opposite direction to a motor drive direction when the motor is driven. In FIG. 13, the motor is driven rightward (RD=L) at a point n and at the time a steering torque t is generated in the left direction and then returns to the right direction. The leftward steering torque is caused by the inertia of the steering wheel and the like. Further, as apparent from FIG. 13, if the delay is not provided with the steering force determination level, when the steering wheel turns while released from a hand, the motor cannot be controlled to restrict the turn of the steering wheel. That is, redundancy is lost when the motor is controlled.

As described above, according to this embodiment, since the steering force determination level changes with a predetermined delay element with respect to the change of state of the motor drive means as well as since the speed change of the steering force determination level caused when the motor drive means changes from a stop state to a drive state is delayed with respect to the speed change caused when the motor drive means changes from the drive state to the stop state, when the motor is repeatedly driven and stopped, the steering force determination level is prevented from being lowered. Further, the steering force determination level is provided with the delay when the motor drive means changes from the stop state to the drive state, the motor can be driven in a direction where the polarity of a steering torque is different from the polarity of a motor drive direction for a predetermined period of time. As a result, the motor control is provided with redundancy.

Embodiment 5

Figure 14:
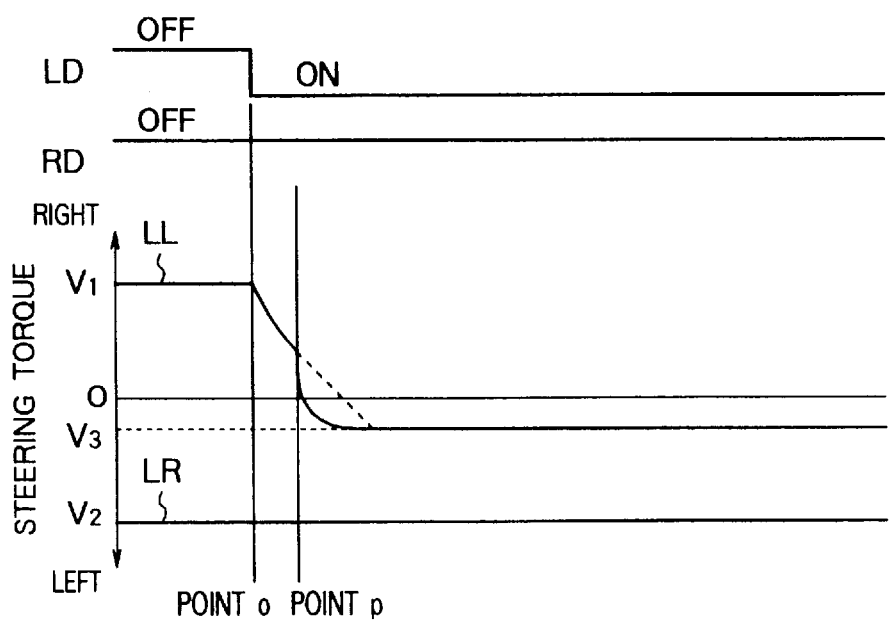
FIG. 14 is a view explaining the operation of an embodiment 5 of the vehicle control apparatus according to the present invention.

FIG. 14 is a view explaining an embodiment 5 of the present invention.

Since the overall circuit of this embodiment is similar to that of FIG. 6 and a motor drive direction restricting circuit 25A which is a circuit arrangement characteristic to this embodiment is also similar to that of FIG. 11, they are not described here.

FIG. 14 explains the operation when the time constant of a steering force determination level which changes depending upon the output signal from a rightward torque comparison unit 251 or a leftward torque comparison unit 252 is set faster than the time constant of the steering force determination level which changes when motor drive signals RD, LD are turned on.

FIG. 14 shows a waveform when a steering torque exceeds a leftward steering force determination value while a leftward drive signal LD is turned on at a point o and the leftward steering force determination value changes. The steering torque exceeds the leftward steering force determination value at a point p and the time constant of the steering force determination level changes. Since the steering force determination level instantly changes when the steering torque exceeds the steering force determination value in FIG. 14, when an abnormal torque is generated by an abnormal motor output and the like, a motor drive direction is instantly restricted and the safety of the system can be increased.

As described above, according to this embodiment, since the steering force determination level changes with a predetermined delay element with respect to the change of state of motor drive means or the change of state of the motor drive direction restricting means as well as the change speed of the steering force determination level caused by the change of state of the motor drive direction restricting means is set faster than the change speed of the steering force determination level caused by the change of state of the motor drive means, when an abnormal steering force is generated by the occurrence of an abnormal motor output and the like. the steering force determination level instantly changes to restrict a direction in which the motor can be driven.

Embodiment 6

Figure 15:
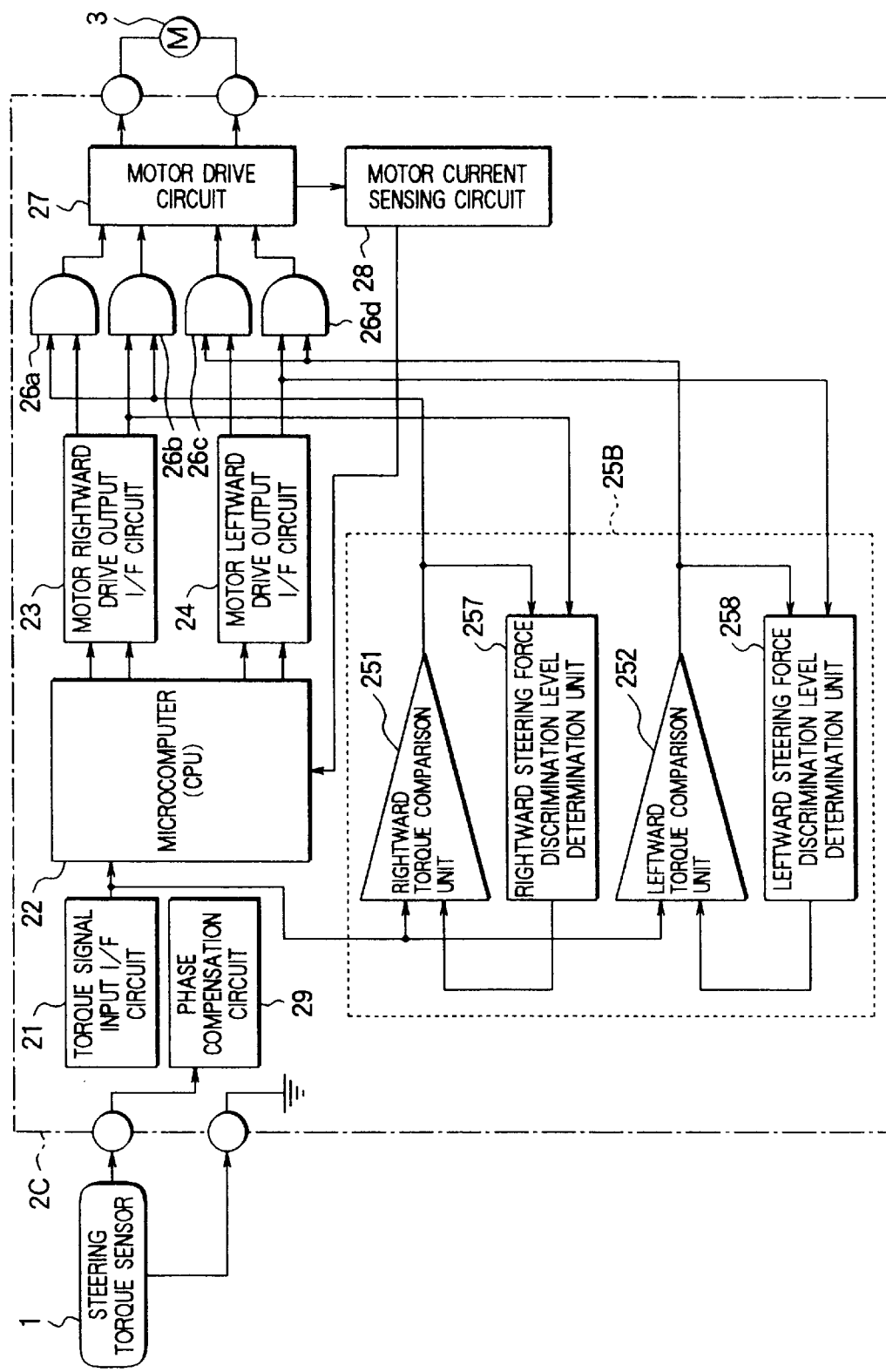
FIG. 15 is a block diagram showing the arrangement of an embodiment 6 of the vehicle control apparatus according to the present invention.

FIG. 15 is a circuit diagram showing the arrangement of an embodiment 6 of the present invention. In the drawing, the same numerals as used in FIG. 9 are used to denote components corresponding to those in FIG. 9 and the detailed description thereof is omitted.

In the drawing, a phase compensation circuit 29 is disposed in front of a torque signal input I/F circuit 21 and it subjects the signal from a steering torque sensor 1 to phase compensation and outputs the phase-compensated value to a motor drive direction restricting circuit 25B and a CPU 22 through a torque signal input I/F circuit 21.

The motor drive direction restricting circuit 25B inputs the phase-compensated steering torque signal to a rightward torque comparison unit 251 and a leftward torque comparison unit 252.

Next, operation will be described.

Figure 16:
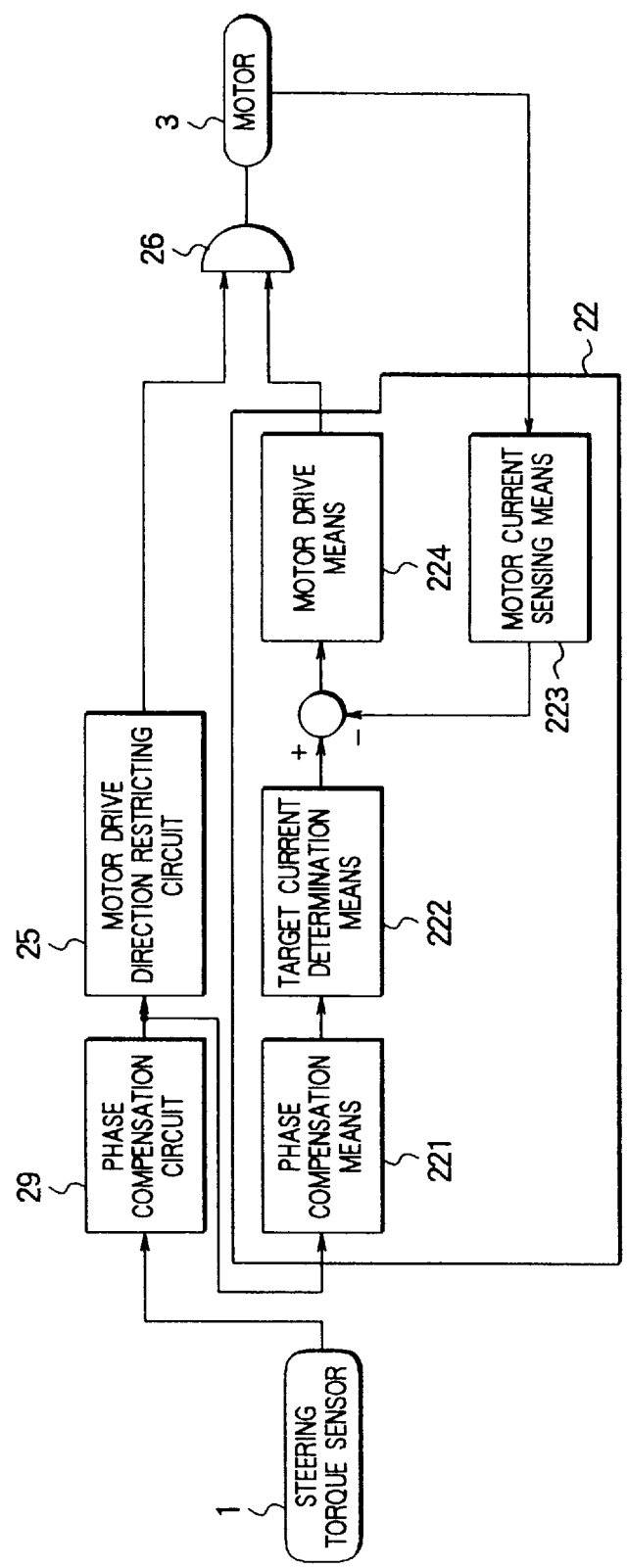
FIG. 16 is a block diagram showing the function of the embodiment 6 of the vehicle control apparatus according to the present invention.

Note, although the detailed description of overall operation is omitted because it is substantially similar to the cases of FIG. 1 and FIG. 6, the operation will be briefly described using FIG. 16 which shows the phase compensation circuit 29 and the CPU 22 and the like whose internal arrangement is similar to that of FIG. 2. Note, to simplify the description, I/F circuits 21, 23, 24, a motor drive circuit 27, a motor current sensing circuit 28 and the like are omitted in FIG. 16.

The steering torque sensed by the steering torque sensor 1 is subjected to phase compensation by phase compensation means 221 in the CPU 22 and target current determination means 222 determines a target current using the phase-compensated torque value. A current flowing to a motor 3 is sensed by a motor current sensing means 223. Then, a difference between the target current value determined by the target current determination means 222 and the motor current sensed by the motor current sensing means 223 is determined and motor drive means 224 outputs a motor drive signal based on the difference. The motor drive signal serves as the motor drive signal of the CPU 22.

The steering torque sensed by the steering torque sensor 1 is input to the phase compensation circuit 29 and the motor drive direction restricting circuit 25B outputs a motor drive direction restricting signal using the signal having a phase compensated by the phase compensation circuit 29. Then, the motor 3 is driven in response to the signal obtained by ANDing the motor drive signal from the CPU 22 and the motor drive signal from the motor drive direction restricting circuit 25B through an AND circuit 26. Malfunction caused by the motor drive direction restricting circuit 25B due to the dislocation of a phase is prevented by adjusting the coefficients of the phase compensation means 221 in the CPU 22 and phase compensation circuit 29.

As described above, according to this embodiment, since the phase compensation means is interposed between the steering force sensing means and the motor drive direction restricting means, the hunting of a motor current caused by the difference between the response speed of the control system and the response speed of the motor drive direction restricting means can be suppressed.

Embodiment 7

Figure 17:
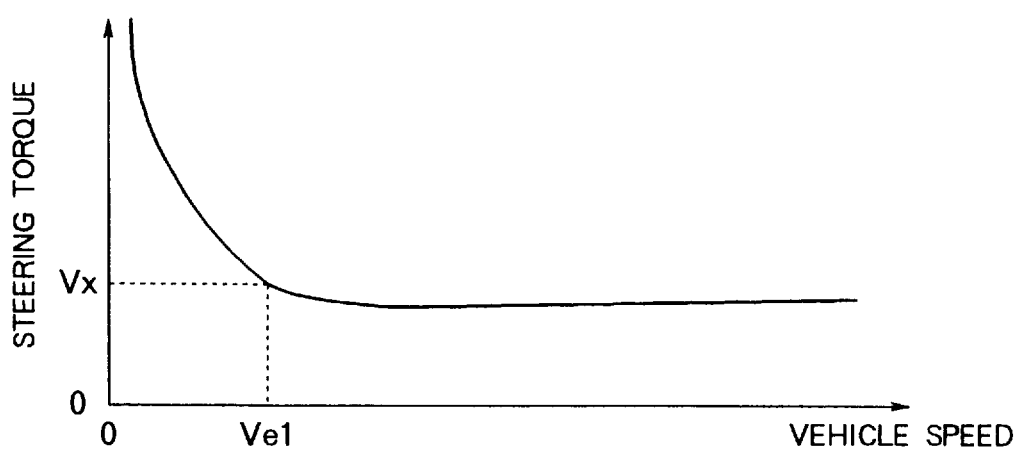
FIG. 17 is a view explaining the operation of an embodiment 7 of the vehicle control apparatus according to the present invention.

FIG. 17 is a view explaining an embodiment 7 of the present invention and shows the relationship between a vehicle speed and a steering torque.

In this embodiment, when a motor drive direction restricted by the aforesaid motor drive direction restricting circuit is released, a steering force determination level is set with respect to a vehicle speed.

With this arrangement, a steering torque generated when the vehicle speed exceeds Ve1 is restricted by a self-alignment torque, the friction force of a road surface, the steering angle of a steering wheel and the like, as apparent from FIG. 17. That is, when a steering torque exceeding Vx is generated at the vehicle speed exceeding Ve1, it is determined that a motor output is abnormal. The reliability and safety of the system are improved by setting the torque Vx as the steering force determination level.

As described above, according to this embodiment, since the steering force determination level is set with respect to the vehicle speed when the motor drive direction restricted by the aforesaid motor drive direction restricting circuit is released, such operation can be prevented, for example, that a rightward steering force which is generated by a steering wheel cut rightward while travelling at a high speed exceeds a leftward steering force determination level and restricts a motor leftward drive direction. Further, this is also applicable when the steering wheel is cut leftward in the same way.

Embodiment 8

Figure 18:
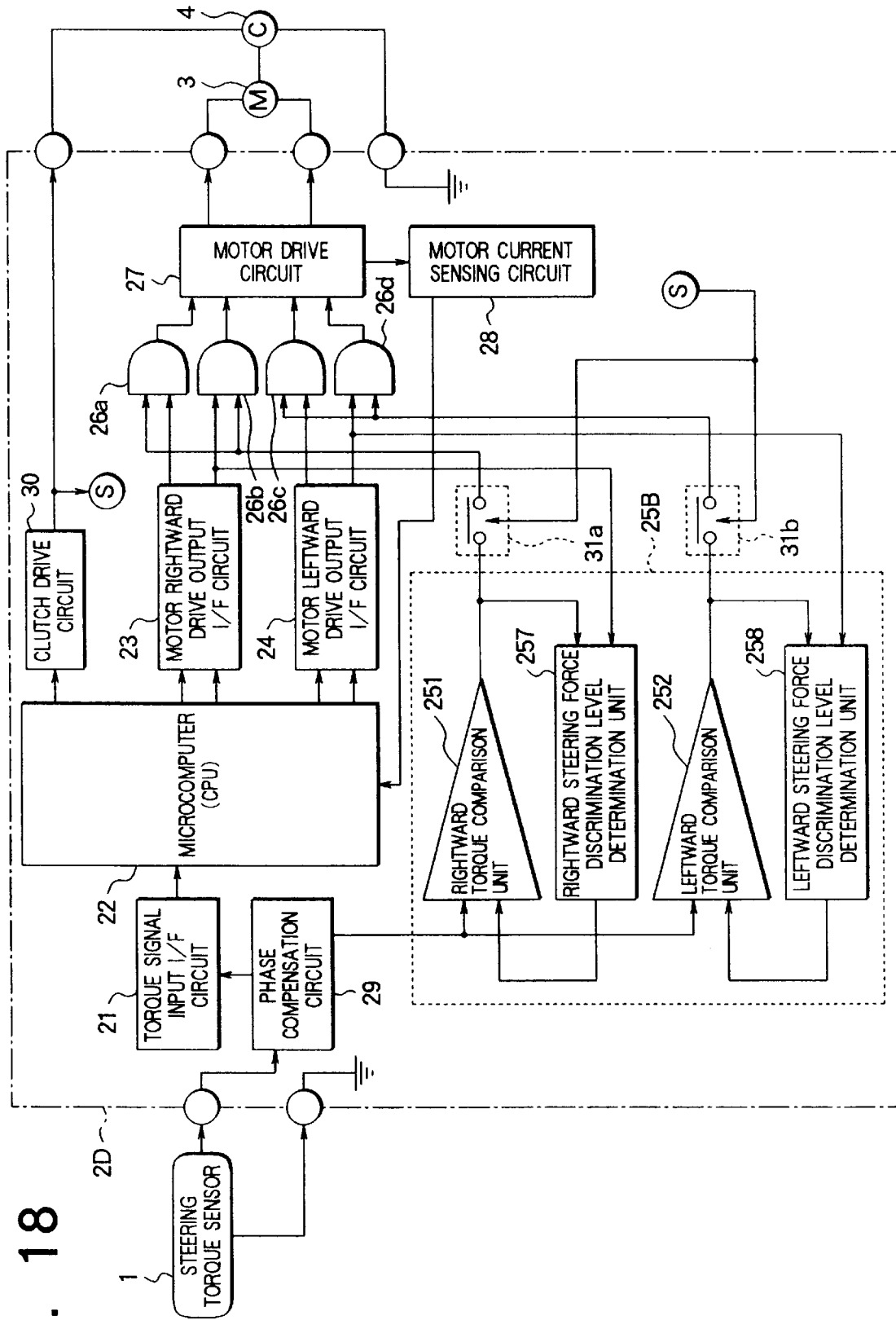
FIG. 18 is a block diagram showing the arrangement of an embodiment 8 of the vehicle control apparatus according to the present invention.

FIG. 18 is a view explaining an embodiment 8 of the present invention. In the drawing, the same numerals as used in FIG. 15 are used to denote components corresponding to those in FIG. 15 and the detailed description thereof is omitted.

In the drawing, a clutch 4 for coupling a motor 3 with a steering system can be engaged and disengaged in response to the clutch drive signal from a controller 2D.

A clutch drive circuit 30 turns on and off the clutch 4 in response to the clutch drive signal from the CPU 22 and switches 31a and 31b disposed in the controller 2D are opened and closed in response to the clutch drive signal from the CPU 22.

The switch 31a is connected to the output of a rightward torque comparison unit 251 from which a rightward drive restricting signal is output and the switch 31b is connected to the output of a leftward torque comparison unit 252 from which a leftward drive restricting signal is output.

Figure 19:
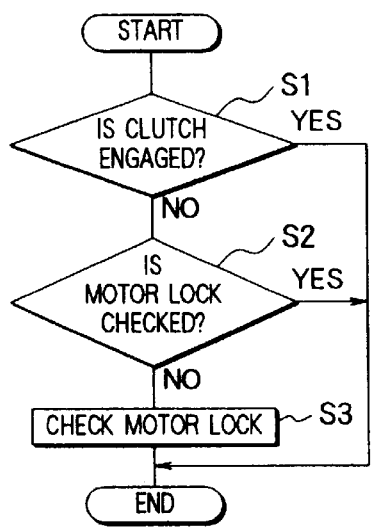
FIG. 19 is a flowchart explaining the operation of the embodiment 8 of the vehicle control apparatus according to the present invention.

Next, operation will be briefly described with reference to FIG. 19.

First, whether a clutch drive signal is output or not is determined, that is, whether the clutch 4 is engaged or not (step S1) and when the clutch drive signal is output, the process is ended.

Further, when the clutch drive signal is not output, whether the lock of the motor 3 is checked or not is determined (step S2). When the lock of the motor 3 is checked, the process is ended, whereas when the lock of the motor 3 is not checked, it is checked (step S3).

When the clutch 4 is disengaged, the output from the a motor drive direction restricting circuit 25B can be made invalid by opening the switches 31a and 31b.

With this arrangement, it is possible to drive the motor 3 when the clutch 4 is disengaged and sense the abnormal state of the motor 3 from the drive state of the motor 3.

Note, the switches 31a and 31b may be composed to transistors or the like.

As described above, according to this embodiment, since the restriction made by motor drive direction restricting means is released when the clutch is disengaged, an abnormal state such as motor lock and the like can be checked by freely driving the motor in a safe state.

Embodiment 9

Figure 20:
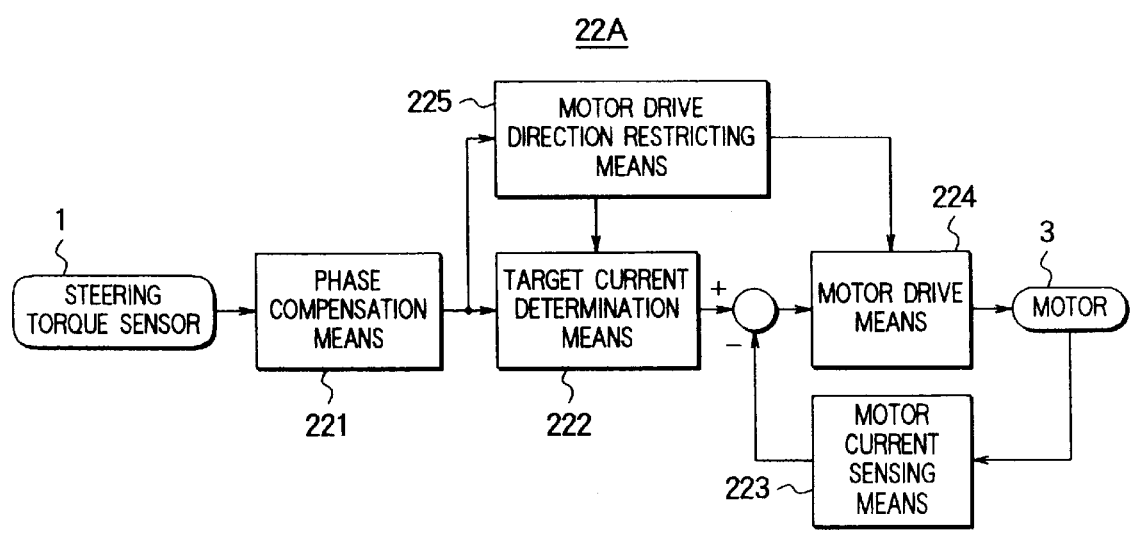
FIG. 20 is a block diagram showing the function of a main portion of an embodiment 9 of the vehicle control apparatus according to the present invention.

FIG. 20 is a functional block diagram showing a embodiment 9 of the present invention. In the drawing, the same numerals as used in FIG. 2 are used to denote components corresponding to those in FIG. 2 and the detailed description thereof is omitted.

In this embodiment, motor drive direction restricting means is substantially incorporated in a CPU 22A. An AND circuit 26 and the like are not shown in the drawing.

The CPU 22A is composed of phase compensation means 221 for compensating the phase of the steering torque sensed by a steering torque sensor 1, target current determination means 222 for determining a current to be flown to a motor 3 from the phase-compensated signal, motor current sensing means 223 for sensing a current flowing to the motor 3, motor drive direction restricting means 225 for estimating its operation from the steering torque and outputting a motor drive direction restricting signal and motor drive means 224 for determining a motor output value from a difference between the target current determined by the target current determination means 222 and the motor current sensed by the motor current sensing means 223 and driving the motor 3 in accordance with the motor output value.

As an overall circuit the circuit shown in FIG. 1 from which the motor drive direction restricting circuit 25 is removed may be used as an example.

It is found from the functional block diagram that a motor current is fed back in the control system. In this feedback control system, when the feed of a motor current is prohibited at a portion which is not related to a motor current control loop, a target current other than zero is instructed, whereas when the motor current is zero, it is contemplated that the motor current is abnormally fed back. However, the occurrence of abnormal feed back is prevented by providing the motor drive direction restricting means 225 and setting the motor target current to zero when a motor output is prohibited.

Figure 21:
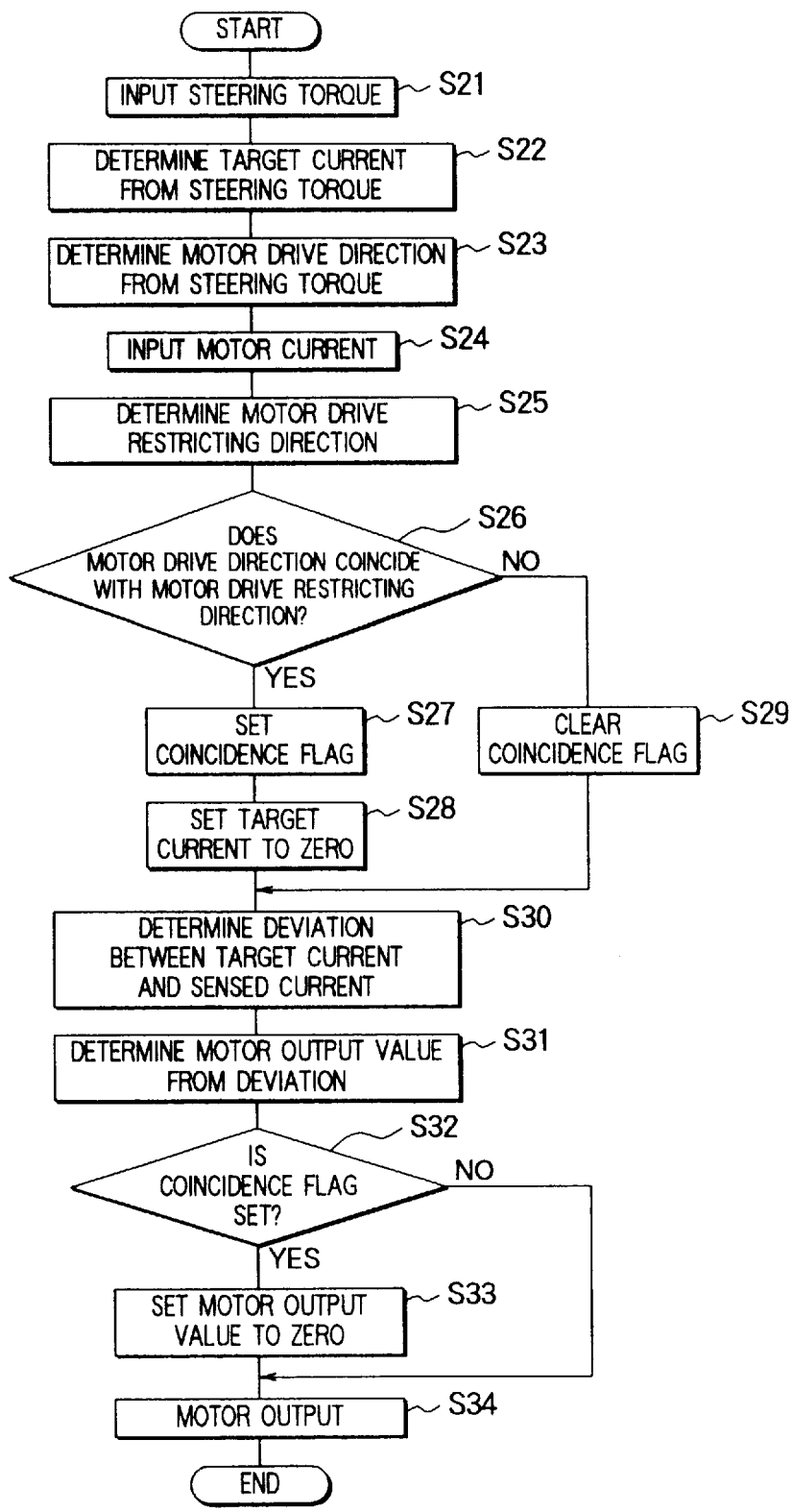
FIG. 21 is a flowchart explaining the operation of the embodiment 9 of the vehicle control apparatus according to the present invention.

Next, operation will be described with reference to the flowchart of FIG. 21.

The steering torque sensed by the steering torque sensor 1 is input to the phase compensation means 221 through a torque signal input I/F circuit 21 for phase compensation and then it is input to the target current determination means 222 (step S21) to thereby determine a target current from the steering torque (step S22). Then, a motor drive direction is also determined from the steering torque (step S23). Next, a motor current is input to the motor current sensing means 223 through a motor current sensing circuit 28 (step S24).

A motor drive restricting direction is determined from the steering torque by the motor drive direction restricting means 225 (step S25).

Next, the target current determination means 222 compares the motor drive direction determined by the target current determination means 222 at step S23 with the motor drive restricting direction determined at step S25 (step S26). When they coincide with each other, a coincidence flag is set (step S27) and the target current is set to zero (step S28). Whereas, when they do not coincide with each other, the coincidence flag is cleared (step S29).

Then, a deviation between the target current and the sensed current is determined (step S30) and the motor drive means 224 determines a motor output value from the deviation (step S31). Next, the state of the coincidence flag operated at step S27 or step 29 is checked (step S32) and when the flag is set, the motor output value is set to zero (step S33) and a motor output is executed (step S34).

With this operation, a motor drive direction is substantially restricted by the motor drive direction restricting means 225 and even if a motor current is not normally fed back, an abnormal state is not caused to the motor current control system.

As described above, according to this embodiment, when a motor drive direction is restricted by the motor drive direction restricting means, since the motor output is stopped and the target motor current is set to zero, the occurrence of an abnormal state of the feedback system (abnormal feedback of the motor current) is prevented.

Embodiment 10

Figure 22:
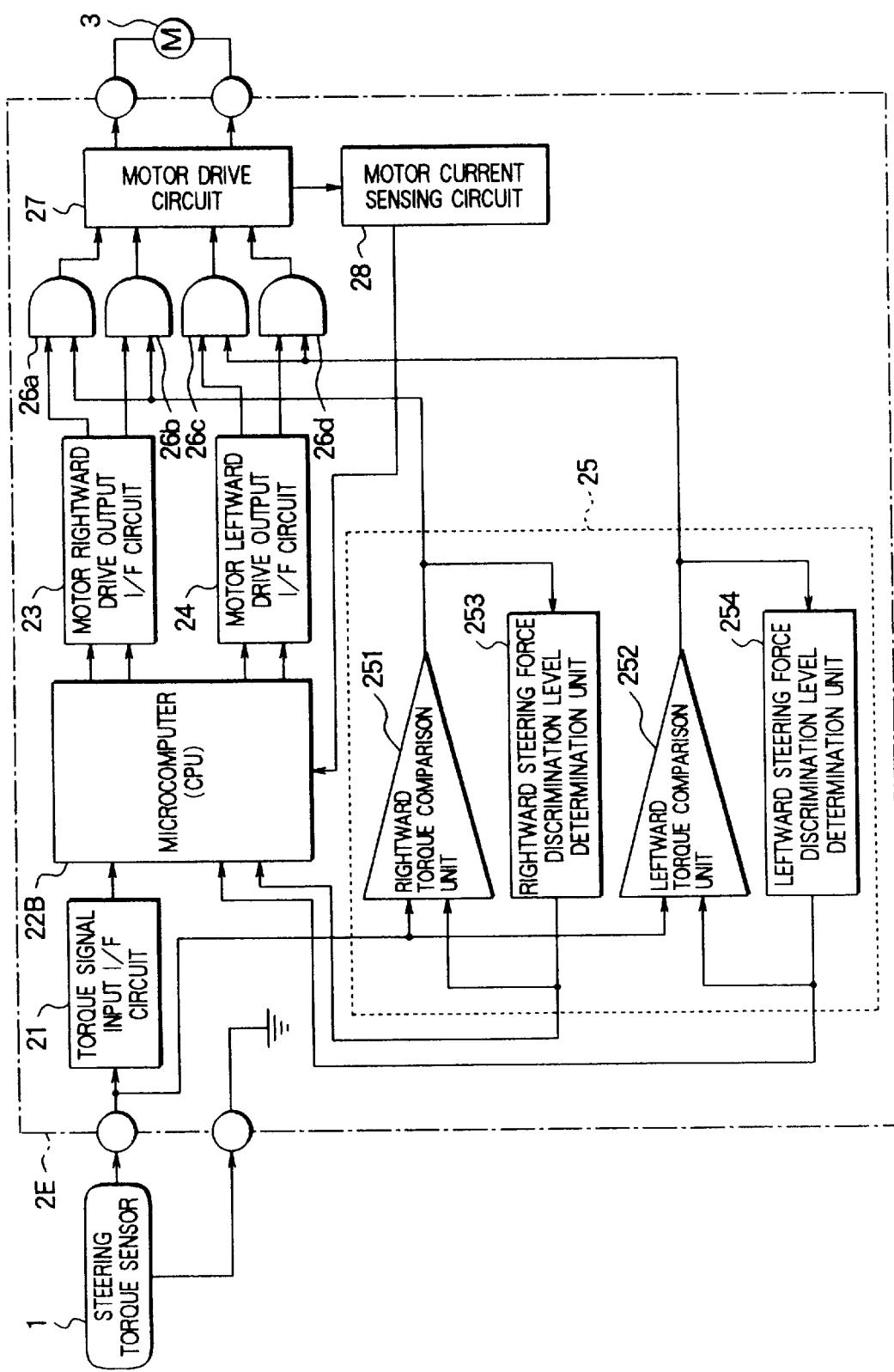
FIG. 22 is a block diagram showing the arrangement of an embodiment 10 of the vehicle control apparatus according to the present invention.

FIG. 22 is a block diagram showing the arrangement of an embodiment 10 of the present invention. In the drawing, the same numerals as used in FIG. 1 are used to denote components corresponding to those in FIG. 1 and the detailed description thereof is omitted.

In this embodiment, the rightward steering force determination value determined by a rightward steering force discrimination level determination unit 253 and the leftward steering force determination value determined by a leftward steering force discrimination level determination unit 254 are input to a CPU 22B, these units 253 and 254 being disposed in a motor drive direction restricting circuit 25 of a controller 2E. The other arrangement of the embodiment 10 is similar to that of FIG. 1.

Figure 23:
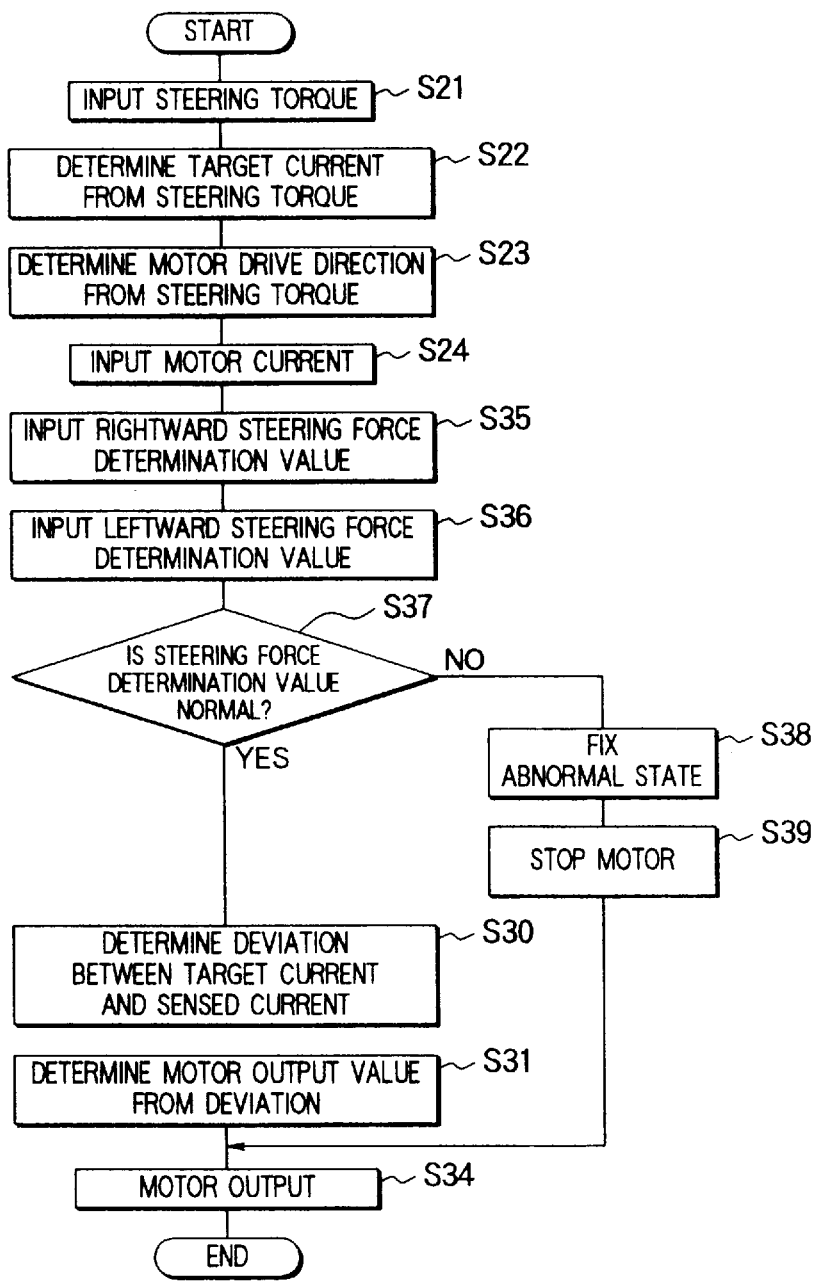
FIG. 23 is a flowchart explaining the operation of the embodiment 10 of the vehicle control apparatus according to the present invention.

Next, operation will be described with reference to the flowchart of FIG. 23. Note, the same numerals as used in FIG. 21 are used to denote steps similar to those of FIG. 21 for description.

The steering torque sensed by the steering torque sensor 1 is input through a torque signal input I/F circuit 21 (step S21) to determine a target current from the steering torque (step S22). A motor drive direction is also determined from the steering torque (step S23). Next, a motor current is input through a motor current sensing circuit 28 (step S24).

Next, the rightward steering force determination value determined by the rightward steering force discrimination level determination unit 253 is input (step S35) and further the leftward steering force determination value determined by the leftward steering force discrimination level determination unit 254 is input (step S36).

Then, the motor drive direction determined at step S23 is compared with the steering force determination values input at step S35 and S36 to determine whether the levels of the respective steering force determination values are normal or not (step S37). When they are normal, a deviation between the target current and the sensed current is determined (step S30) and a motor output value is determined from the deviation (step S31). Then, a motor output is executed (step S34).

On the other hand, when the levels of the respective steering force determination values are not normal at step S37, the abnormal state of them is fixed (step S38) and a motor 3 is set to a non-driving state (step S39). Note, in the aforesaid, the steering force determination values are preset within the range to which a steering torque can be input. Further, when the abnormal state is fixed at step S38, a predetermined wait time may be provided.

With this operation, the CPU 22B can monitor the steering force determination values and the abnormal state of the motor drive direction restricting circuit 25 and the like can be sensed.

As described above, according to this embodiment, since the steering force determination levels are set within the range to which an input can be executed by steering force means, the abnormal state of the steering force determination levels can be checked.

Embodiment 11

Figure 24:
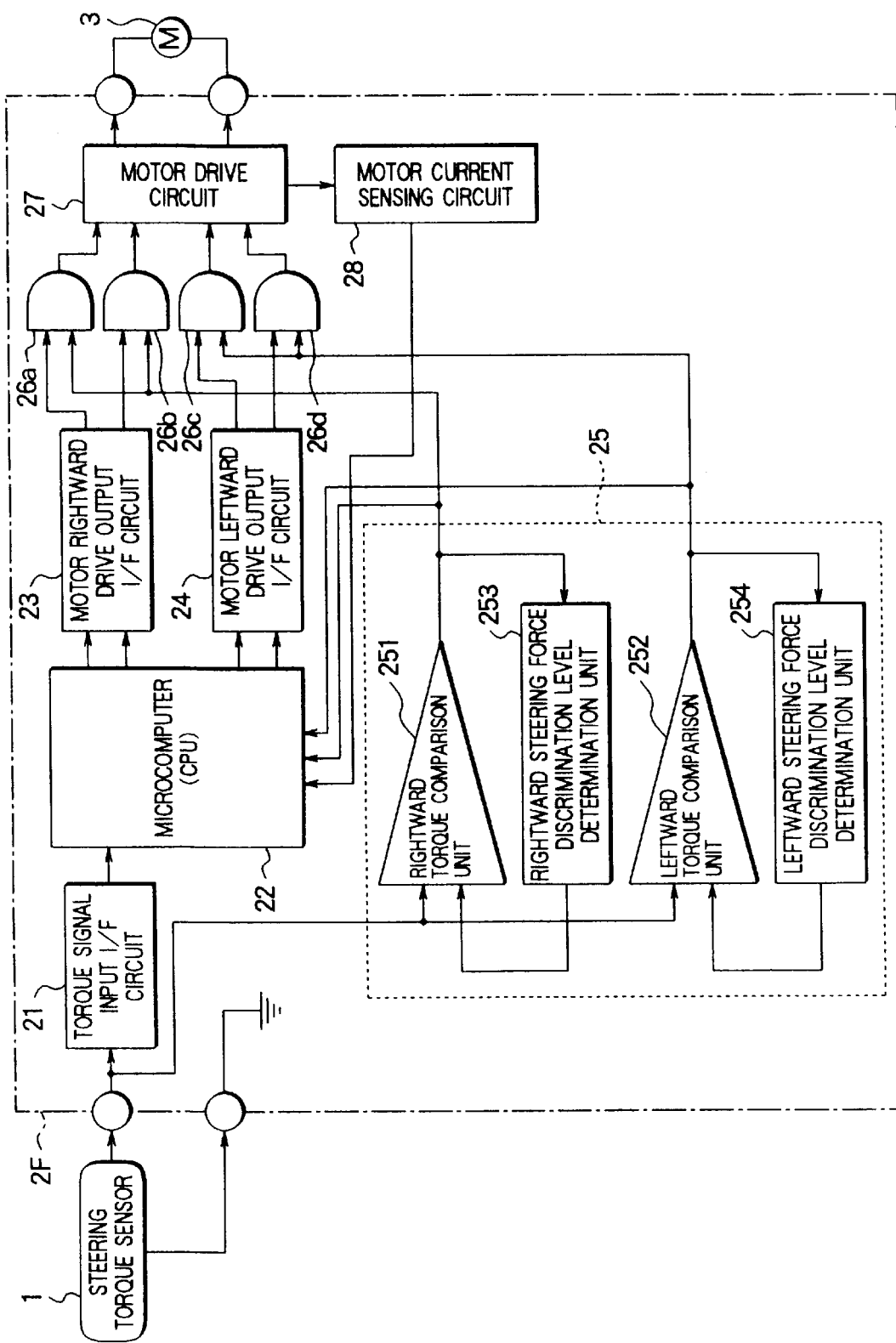
FIG. 24 is a block diagram showing the arrangement of an embodiment 11 of the vehicle control apparatus according to the present invention.

FIG. 24 is a block diagram showing the arrangement of an embodiment 11 of the present invention. In the drawing, the same numerals as used in FIG. 1 are used to denote components corresponding to those in FIG. 1 and the detailed description thereof is omitted.

In this embodiment, the rightward drive restricting signal from a rightward torque comparison unit 251 and the leftward drive restricting signal from a leftward torque comparison unit 252 are input to a CPU 22C, these units 251, 252 being disposed in a motor drive direction restricting circuit 25 in a controller 2F, so that the CPU 22C can monitor a motor drive restricting direction. The other arrangement of the embodiment 11 is similar to that of FIG. 1.

Figure 25:
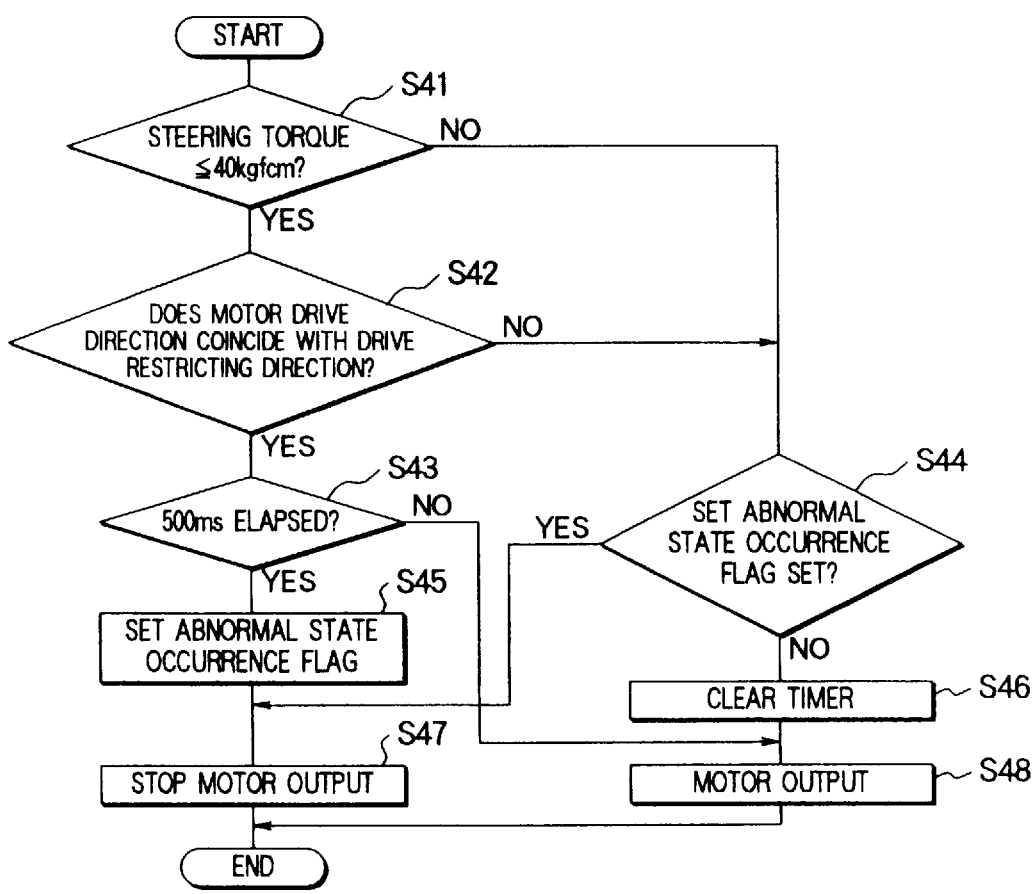
FIG. 25 is a flowchart explaining the operation of the embodiment 11 of the vehicle control apparatus according to the present invention.

Next, operation will be described with reference to the flowchart of FIG. 25.

Whether or not the steering torque sensed by a steering torque sensor 1 is, for example, 40 kgfcm or less (step S41) is determined (step S41) and when it is 40 kgfcm or less, whether or not a motor drive direction coincides with the motor drive direction restricted by the motor drive direction restricting circuit 25 is determined at step S42. When they are coincide with each other, an elapsed time is measured by a timer (not shown) at step S43 and whether 500 ms, for example, elapsed or not is determined, and when 500 ms elapsed, an abnormal state occurrence flag is set (step S45) and a motor output is stopped (step S47).

When the steering torque exceeds 40 kgfcm at step S41, or when it is determined at step S42 that the motor drive directions do not coincide with each other, whether the abnormal state occurrence flag is set or not is determined at step S44, and when it is set, the motor output is stopped at step S47. Further, when the flag is not set, the 500 ms timer is cleared at step S46 and then the motor output is executed at step S48. Further, the motor output is executed at step S48 until 500 ms elapses at step S43.

With this operation, the abnormal state of the motor output and the like of the motor drive direction restricting circuit 25 and the CPU 22C can be sensed.

As described above, according to this embodiment, since motor drive is prohibited when a steering force is equal to or less than a predetermined value and a motor drive direction is restricted longer than a predetermined time by the motor drive direction restricting means, the abnormal state of the motor drive direction restricting means and motor output system can be sensed and a motor output is prohibited when an abnormal state occurs, thus safety is improved.

Embodiment 12

Figure 26:
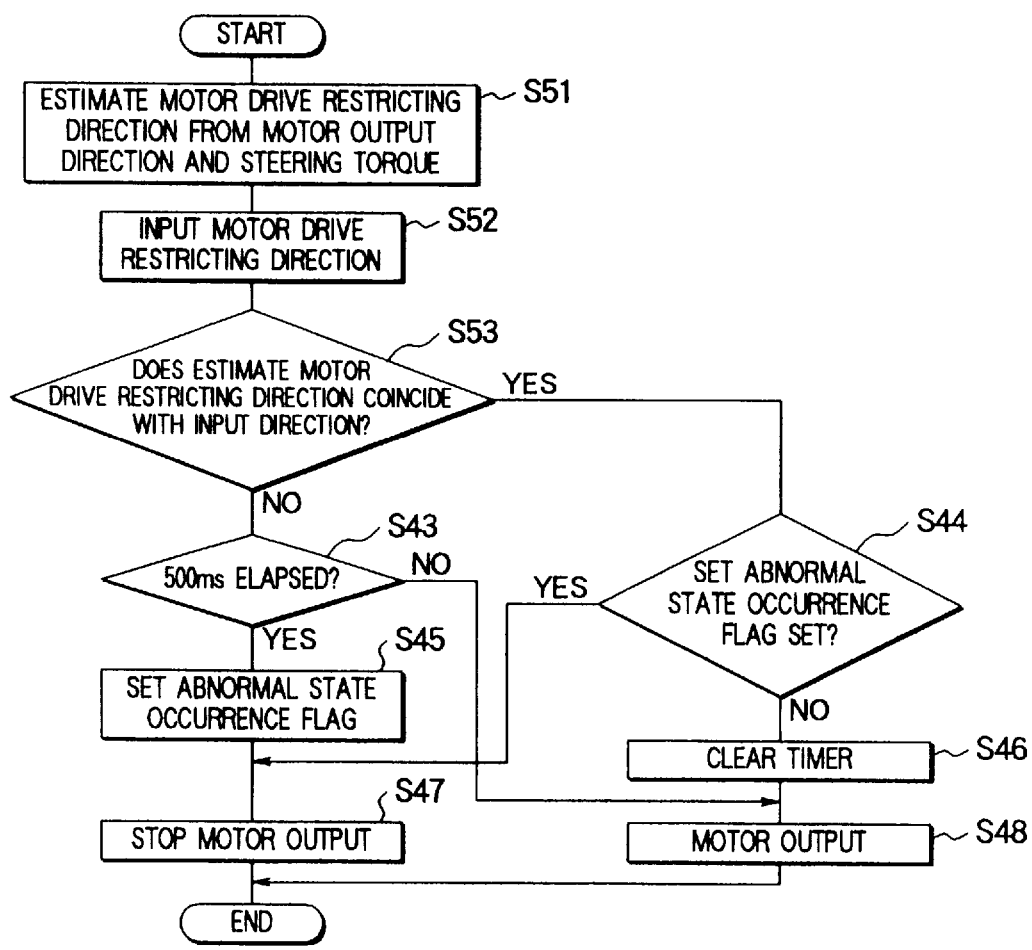
FIG. 26 is a flowchart explaining the operation of an embodiment 12 of the vehicle control apparatus according to the present invention.

FIG. 26 is a flowchart showing an embodiment 21 of the present invention.

The circuit of this embodiment is arranged, for example, as shown by the circuit of FIG. 24.

Next, operation will be described with reference to the flowchart of FIG. 26. Note, in FIG. 26, the same numerals as used in FIG. 25 are used to denote steps corresponding to those in FIG. 25 for description.

A motor drive direction restricted by a motor drive direction restricting circuit 25 is estimated from a motor output direction and a steering torque (step S51). Then, an actual motor drive restricting direction is input by the motor drive direction restricting circuit 25 (step S52) and whether the motor drive restricting direction estimated at step S51 coincides with the actual motor drive restricting direction or not (step S53).

When they do not coincide with each other, a time elapsed (500 ms) is measured by a timer at step S43 and when 500 ms elapsed, an abnormal state occurrence flag is set (step S45). Then, a motor output is stopped (step S47).

Whereas, when they coincide with each other, whether the abnormal state occurrence flag is set or not is checked (step S44), and when the abnormal flag is set, the motor output is stopped at step S47. Whereas, when flag is not set, the 500 ms timer is cleared at step 46 and the motor output is executed at step 48.

With this operation, the abnormal state of the motor drive direction restricting circuit 25, a motor output from a CPU 22, steering torque signal and the like can be sensed. Further, the abnormal state can be sensed regardless of the state of the motor drive direction restricting means.

As described above, according to this embodiment, since the operation of the motor drive direction restricting means is estimated from the state of the motor drive means and a steering force as well as this operation is compared with the operation executed by the motor drive direction restricting means and when they do not continuously coincide with each other longer than a predetermined time, motor drive is stopped, the abnormal state of the motor drive direction restricting means, motor output system and steering torque system can be sensed. When the abnormal state occurs, since the motor output is prohibited, safety is improved.

Embodiment 13

Figure 27:
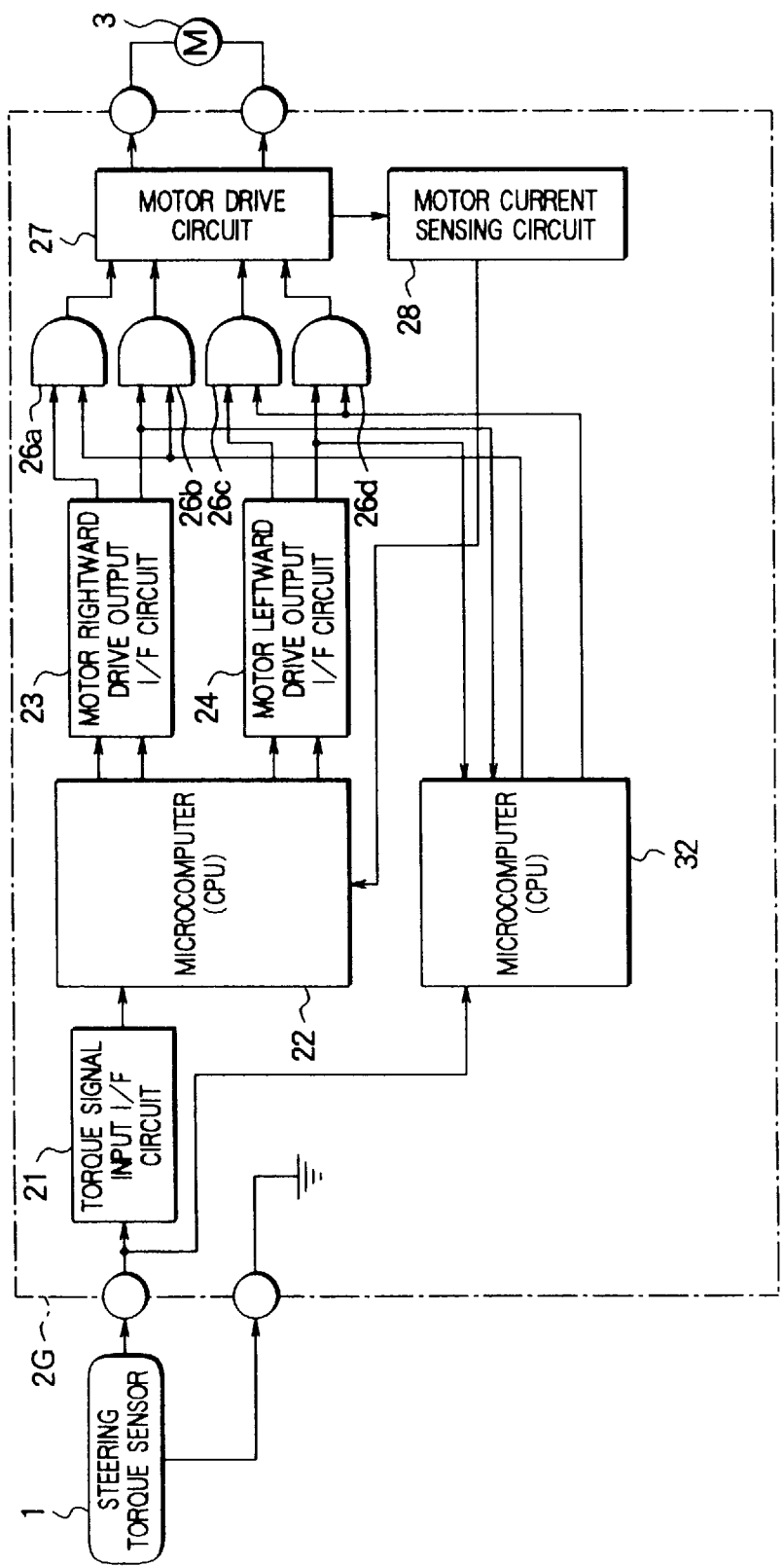
FIG. 27 is a block diagram showing the arrangement of an embodiment 13 of the vehicle control apparatus according to the present invention.

FIG. 27 is a block diagram showing the arrangement of an embodiment 13. In the drawing, the same numerals as used in FIG. 1 and FIG. 6 are used to denote components corresponding to those in FIG. 1 and FIG. 6 and the detailed description thereof is omitted.

In this embodiment, a microcomputer 32 (hereinafter, referred to as a CPU 32) is disposed in a controller 2G in place of the aforesaid motor drive direction restricting circuit.

Figure 28:
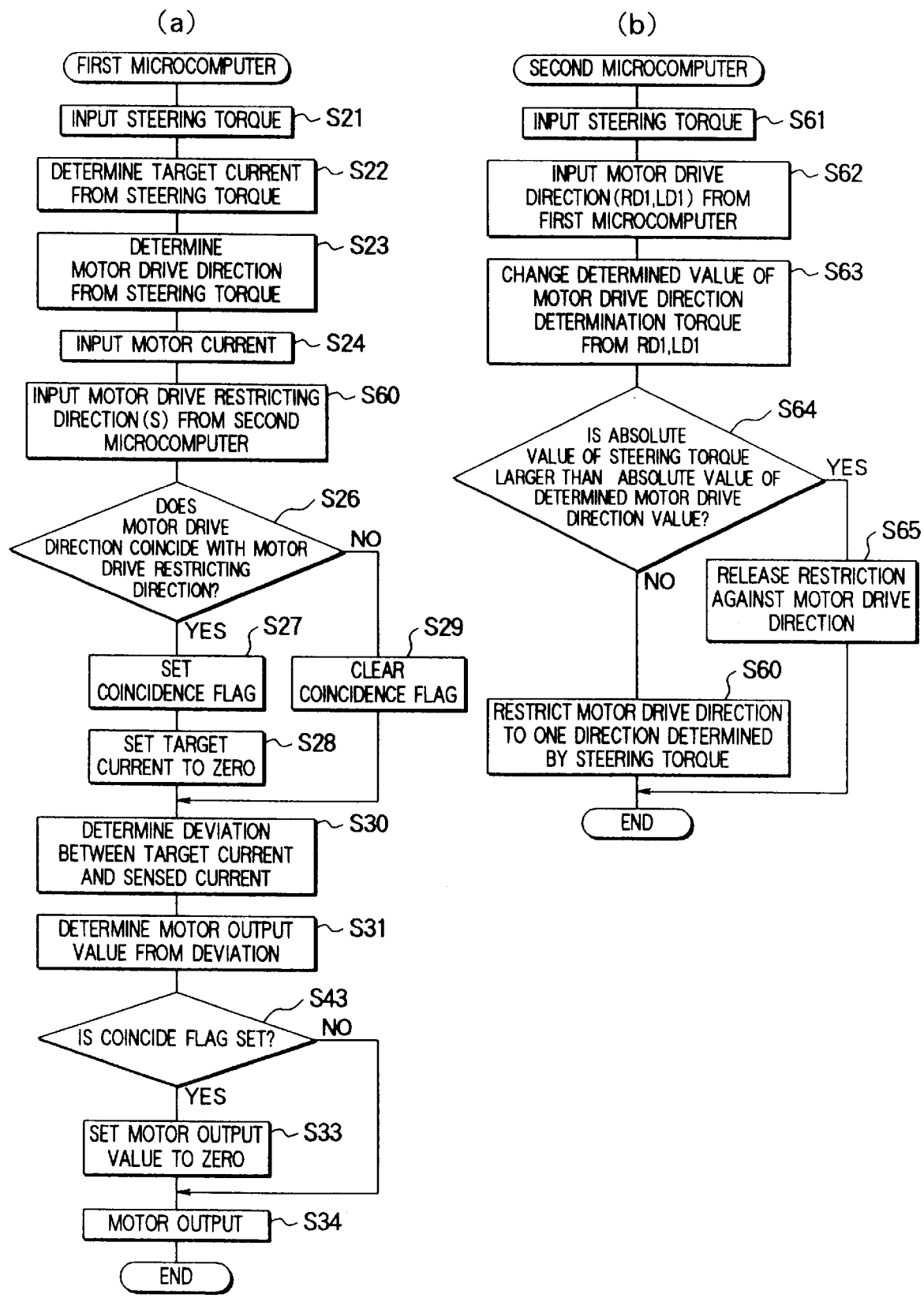
FIG. 28 is a flowchart explaining the operation of the embodiment 13 of the vehicle control apparatus according to the present invention.
Figure 29:
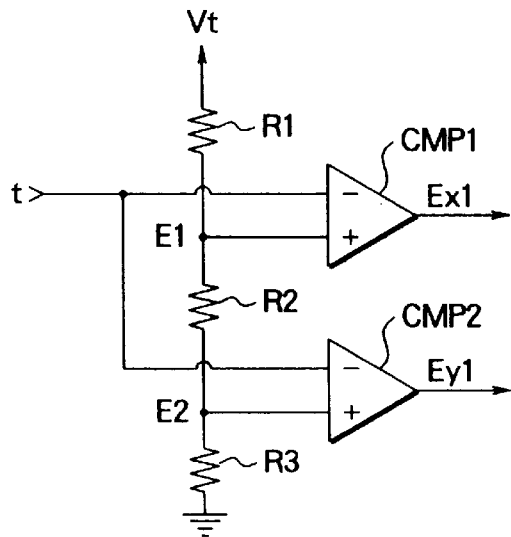
FIG. 29 is a circuit diagram showing a specific example of a conventional motor drive direction restricting means.
Figure 30:
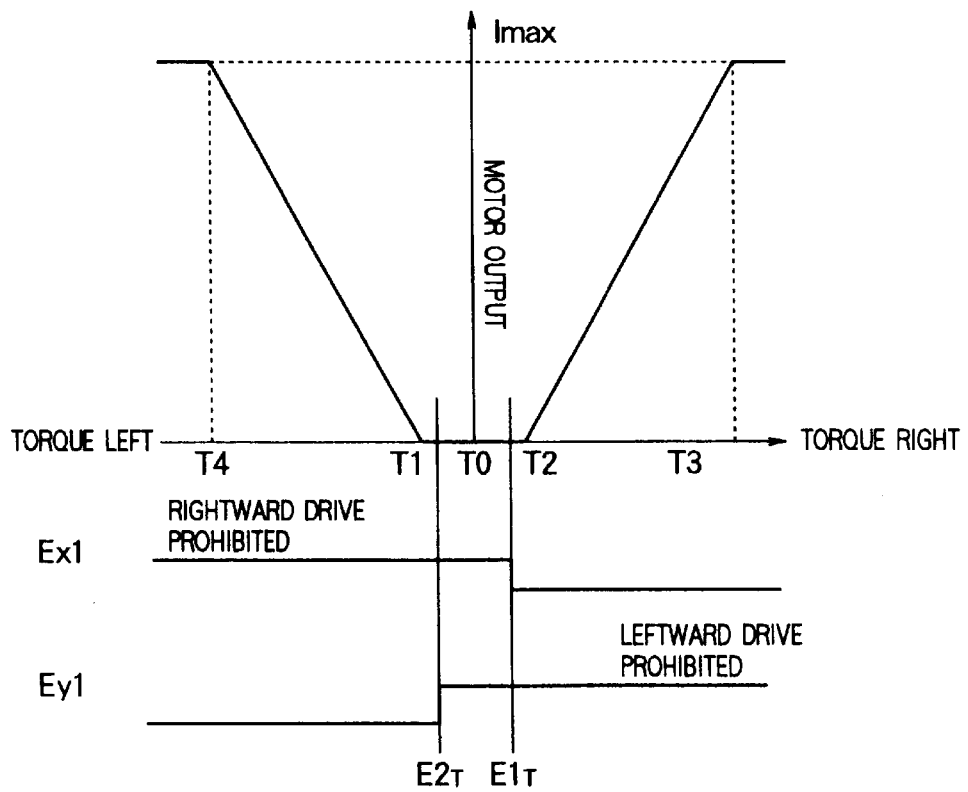
FIG. 30 is a view explaining the operation of FIG. 29.
Figure 31:
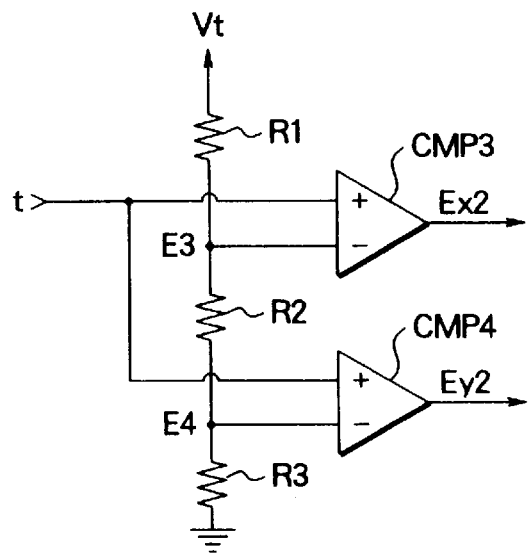
FIG. 31 is a circuit diagram showing a specific example of the conventional motor drive direction restricting means.
Figure 32:
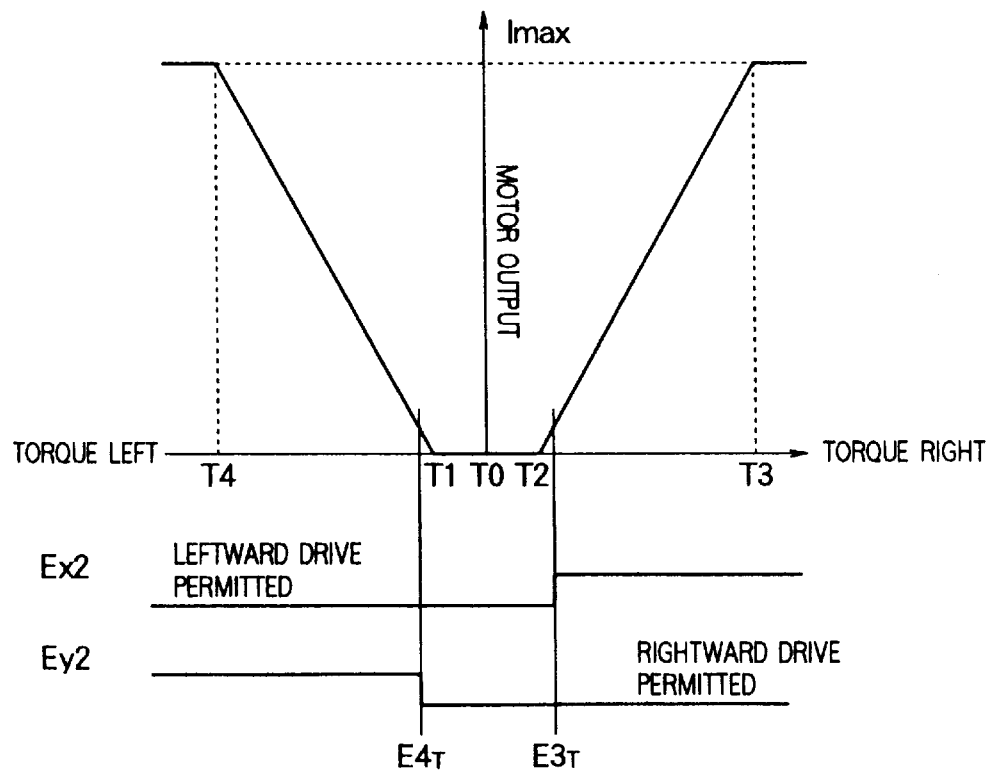
FIG. 32 is a view explaining the operation of FIG. 31.

Next, operation will be described with reference to the flowchart of FIG. 28.

FIG. 28(a) is a flowchart showing the processing executed by a CPU 22 as a first microcomputer and FIG. 28(b) is a flowchart showing the processing executed by the CPU 32 as a second microcomputer. Note, in the drawings, since steps denoted by the same numerals as those of FIG. 21 represent the same operation, only different steps will be described here.

The CPU 22 inputs a motor drive restricting direction from the CPU 32 at step S60 and compares at step 26 the motor drive restricting direction with a motor drive direction determined at step S23.

The CPU 32 inputs a steering torque from a steering torque sensor 1 at step S61 and also inputs a rightward motor drive direction signal RD1 and leftward motor drive signal LD1 from the CPU 22 at step S62. Then, the CPU 32 changes a determined steering torque value in accordance with the rightward motor drive signal RD1 or leftward motor drive signal LD1 at step S63. At step S64, the CPU 32 determines whether the absolute value of the steering torque is larger than a determined motor drive direction value or not, and when the former is larger than the latter, the CPU 32 release the restriction of the motor drive direction (step S65). Whereas, when the former is equal or smaller than the latter, the CPU 32 restricts the motor drive direction to one direction determined by the steering torque (step S66).

As described above, according to this embodiment, a motor drive direction can be restricted only by comparing a steering force determination level with a steering force each corresponding to a motor drive direction and motor drive can be restricted only to a direction corresponding to the polarity of a steering force. That is, an adverse affect to steering feeling caused by the motor drive direction restricting means is removed and excellent steering feeling can be provided. Further, the safety and reliability of the system is improved.

What is claimed is:

1. A vehicle control apparatus, comprising:
   steering force sensing means for sensing a steering force;
   a motor for generating a steering assisting force;
   motor drive means connected to said steering force sensing means for determining the drive direction of said motor based on at least said steering force; and
   motor drive direction restricting means connected to said steering force sensing means and said motor drive means for restricting the drive direction of said motor determined by said motor drive means based on a steering force determination level generated by a steering force discrimination level determination means included in said motor drive direction restricting means;
   wherein said steering force determination level serves as a criterion for restricting the drive direction of said motor and said steering force determination level is changeable.

2. A vehicle control apparatus according to claim 1, wherein said motor drive means includes a bridge circuit composed of at least four transistors and said motor drive direction restricting means restricts operation with respect to a pair of the transistors of said bridge circuit.

3. A vehicle control apparatus according to claim 1, wherein said motor drive restricting means includes a switching means which is used to determine said steering force determination level by selectively switching a first resistance in parallel with a second resistance contained within a voltage divider based upon at least the output state of said motor drive restricting means.

4. A vehicle control apparatus according to claim 1, wherein the motor drive restricting means includes at least one feedback circuit which receives the output state of the motor drive restricting means for changing the steering force determination level.

5. A vehicle control apparatus, comprising:
   steering torque sensing means for sensing a torque value representing at least one of a rightward steering torque and a leftward steering torque;
   a motor for generating a steering assisting force;
   motor drive means connected to said steering torque sensing means for determining the drive direction of said motor based on at least one of said rightward steering torque and said leftward steering torque; and
   motor drive direction restricting means connected to said steering force sensing means and said motor drive means for restricting the drive direction of said motor, wherein said motor drive direction restricting means is comprised of a rightward torque comparison means for comparing said torque value with a rightward steering force determination level which is changeable based upon at least an output state of said rightward torque comparison means and a leftward torque comparison means for comparing said torque value with a leftward steering force determination level changeable based upon at least an output state of said leftward torque comparison means.

6. A vehicle control apparatus according to claim 5, wherein each of said rightward and leftward torque comparison means include a switching means which is used to determine said rightward steering force determination level and said leftward steering force discrimination level, respectively, by selectively switching a first resistance in parallel with a second resistance contained within a voltage divider based upon at least the output state of the motor drive restricting means.

7. A vehicle control apparatus according to claim 5, wherein the motor drive restricting means includes a feedback circuit associated with said rightward and leftward torque comparison means which feeds back the output state of said rightward and leftward torque comparison means, respectively, for changing the respective rightward and leftward steering force determination levels.

8. A vehicle control apparatus according to claim 6, wherein said motor drive means includes a bridge circuit composed of at least four transistors and said motor drive direction restricting means restricts operation with respect to a pair of the transistors of said bridge circuit.

* * * * *